US009775079B2

(12) United States Patent
Cheng et al.

(10) Patent No.: US 9,775,079 B2
(45) Date of Patent: Sep. 26, 2017

(54) METHOD AND APPARATUS FOR MOBILE TERMINAL CONNECTION CONTROL AND MANAGEMENT OF LOCAL ACCESSES

(75) Inventors: Hong Cheng, Singapore (SG); Chan Wah Ng, Singapore (SG); Shinkichi Ikeda, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 710 days.

(21) Appl. No.: 14/342,240

(22) PCT Filed: Sep. 7, 2012

(86) PCT No.: PCT/JP2012/005677
§ 371 (c)(1),
(2), (4) Date: Feb. 28, 2014

(87) PCT Pub. No.: WO2013/042330
PCT Pub. Date: Mar. 28, 2013

(65) Prior Publication Data
US 2014/0204909 A1     Jul. 24, 2014

(30) Foreign Application Priority Data

Sep. 22, 2011    (JP) .................................. 2011-207924

(51) Int. Cl.
*H04W 36/00*    (2009.01)
*H04W 8/08*    (2009.01)

(52) U.S. Cl.
CPC ....... *H04W 36/0066* (2013.01); *H04W 8/082* (2013.01); *H04W 36/0027* (2013.01)

(58) Field of Classification Search
CPC . H04W 36/22; H04W 28/08; H04W 36/0066; H04W 8/082; H04W 36/0027
(Continued)

(56) References Cited

U.S. PATENT DOCUMENTS

2011/0075675 A1 * 3/2011 Koodli .................... H04L 12/14
370/401
2011/0171953 A1    7/2011 Faccin et al.
(Continued)

FOREIGN PATENT DOCUMENTS

WO    2011/069092 A1    6/2011

OTHER PUBLICATIONS

International Search Report for Application No. PCT/JP2012/005677 dated Jan. 15, 2013.
(Continued)

*Primary Examiner* — Melvin Marcelo
(74) *Attorney, Agent, or Firm* — Pearne & Gordon, LLP

(57) ABSTRACT

An offloading method comprising the steps of: when the mobile terminal starts offloading in a first network, transmitting, by the mobile terminal, a first message to a mobility management device performing mobility management of the mobile terminal in a second network, the first message including information indicating that the offloading is started; transmitting, by the mobility management device, a second message to the mobile terminal, the second message including selection information in the second network, the selection information being for selecting, on basis of the first message, as to in which network offloading is to be performed; and deciding, by the mobile terminal, whether the offloading is to be maintained in the first network or whether new offloading is to be performed in the second network on a basis of the selection information included in the second message and judgment information in the first network that the mobile terminal has.

11 Claims, 12 Drawing Sheets

(58) Field of Classification Search
USPC .......................................................... 370/401
See application file for complete search history.

(56) References Cited

U.S. PATENT DOCUMENTS

2012/0263145 A1* 10/2012 Marinier ............... H04W 36/22
370/331
2014/0177446 A1* 6/2014 Sun ........................ H04L 45/38
370/236

OTHER PUBLICATIONS

3GPP TR 23.829 v10.0.0 Release 10, Mar. 29, 2011, Technical Specification Group Services and System Aspects; Local IP Access and Selected IP Traffic Offload, http://www.3gpp.org/FTP/Specs/archive/23_series/23.829/23829-a00.zip.

3GPP TS 23.402 v10.4.0, Release 10, Jun. 12, 2011, Technical Specification Group Services and System Aspects; Architecture enhancements for non-3GPP accesses, http://www.3gpp.org/FTP/Specs/archive/23_series/23.402/23402-a40.zip.

3GPP TS 23.401 v10.4.0, Release 10, Jun. 12, 2011, Technical Specification Group Services and System Aspects; General Packet Radio Service (GPRS) enhancements for Evolved Universal Terrestrial Radio Access Network (E-UTRAN) access, http://www.3gpp.org/FTP/Specs/archive/23_series/23.401/23401-a40.zip.

3GPP TS 23.060 v10.4.0, Release 10, Jun. 12, 2011, Technical Specification Group Services and System Aspects; General Packet Radio Service (GPRS); Service description; Stage 2, http://www.3gpp.org/FTP/specs/archive/23_series/23.060/23060-a40.zip.

IEEE 802.11U-2011, IEEE Standard for information technology—Telecommunications and information exchange between systems—Local and metropolitan area networks—Specific requirements Part II: Wireless Lan Medium Access Control (MAC) and Physical Layer (PHY) specifications-Amendment 9: Interworking with External Networks, http://standards.ieee.org/getieee802/download/802/download/802.11u2011.pdf.

3GPP TS 23.402 v11.0.0, Release 11, Sep. 2011, Technical Specification Group Services and System Aspects; Architecture enhancements for non-3GPP accesses.

"Discussing the choice of the most appropriate path to send an IP flow", 3GPP Draft; s2-101578-Steering IP@ ISC-ALU-V0.2, 3rd Generation Partnership Project (3GPP), Mobile Competence Centre; 650, Route Des Lucioles; F-06921 Sophia-Antipolis Cedex; France, vol. SA WG2, no. San Francisco, USA; 20100222, Feb. 20, 2010 (Feb. 20, 2010), XP050434007.

* cited by examiner

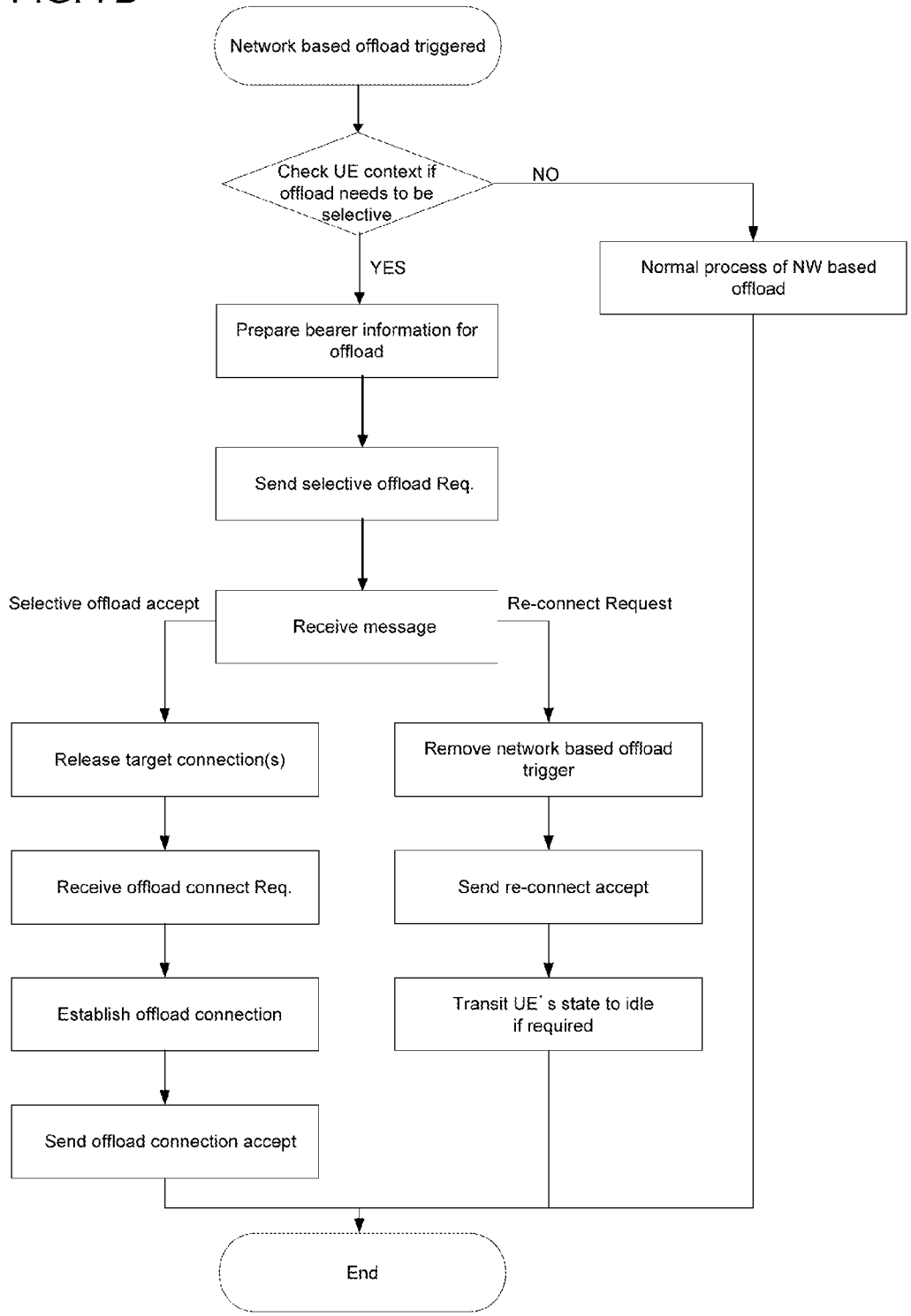

METHOD AND APPARATUS FOR MOBILE TERMINAL CONNECTION CONTROL AND MANAGEMENT OF LOCAL ACCESSES

TECHNICAL FIELD

This disclosure relates to a data communication network. More specifically, it relates to the management for the mobile terminal's connections in a mobile communication system.

BACKGROUND ART

With the introduction of new powerful mobile devices and the popularity of multimedia applications, the traffic over mobile communication networks has been increasing exponentially. This puts a great pressure on the mobile communication networks, whose capacity cannot increase as fast and may be limited by physical, financial, or regulatory reasons. Therefore, multiple offloading technologies have been introduced to alleviate traffic load from the operator's core network, e.g. the Local IP Access (LIPA) and Selected IP Traffic Offloading (SIPTO) (NPD 1), and the non-seamless WLAN offloading (NSWO) (NPD 2), etc.

With LIPA or SIPTO, a User Equipment (UE) accessing the network via cell/cells of a HNB/HeNB can obtain access to network that is connected or near to the HNB/HeNB. For example, LIPA or SIPTO allows direct access to the home based network, corporate network, or general Internet without going through the operator's core network. The establishment of the LIPA connections could be UE initiated based on local or operator provisioned policies or user input. On the other hand, the SIPTO connections are initiated by the network, e.g. by monitoring the location of the terminal and triggering a disconnection and reconnection when necessary to relocate the gateways.

Using the NSWO, the UE is able to access general Internet or local network resources simultaneously with access to the operator's core network (NPD 2). The UE makes use of user preference, operator provisioned policies, and local environment parameters to decide on which traffic should be routed via the NSWO. The use of the NSWO does not prevent the UE perform other connections.

CITATION LIST

Non Patent Literature

[NPL 1] Local IP Access and Selected IP Traffic Offload, 3GPP TR 23.829 v10.0.0 Release 10, 2011 Mar. 29, http://www.3gpp.org/FTP/Specs/archive/23_series/23.829/23829-a00.zip

[NPL 2] Architecture enhancements for non-3GPP accesses, 3GPP TS23.402v10.4.0, 2011 Jun. 12 http://www.3gpp.org/FTP/Specs/archive/23_series/23.402/23402-a40.zip

[NPL 3] General Packet Radio Service (GPRS) enhancements for Evolved Universal Terrestrial Radio Access Network (E-UTRAN) access, 3GPP TS 23.401 v10.4.0 Release 10, 2011 Jun. 12, http://www.3gpp.org/FTP/Specs/archive/23_series/23.401/23401-a40.zip

[NPL 4] General Packet Radio Service (GPRS); Service Description; Stage 2, 3GPP TS 23.060 v10.4.0, Release 10, 2011 Jun. 12 http://www.3gpp.org/FTP/Specs/archive/23_series/23.060/23060-a40.zip

[NPL 5] IEEE 802.11u-2011, IEEE Standard for information technology—Telecommunications and information exchange between systems—Local and metropolitan area networks—Specific requirements Part II: Wireless LAN Medium Access Control (MAC) and Physical Layer (PHY) specifications—Amendment 9: Interworking with External Networks http://standards.ieee.org/getieee802/download/802.11u-2011.pdf

SUMMARY OF INVENTION

Technical Problem

In the 3GPP system, the 3GPP access and the non-3GPP access are managed by different core network entities. For example, the Mobility Management Entity (MME) or Serving GPRS Support Node (SGSN) controls and manages the UE's connections via the 3GPP access, e.g. through NodeB or eNodeB (NPD 3). On the other hand, the UE's connections via non-3GPP access, e.g. WLAN, are managed by the Authentication, Authorization and Accounting (AAA) Server (NPD 2).

As mentioned earlier, the different types of offloading may utilize different access types, e.g. LIPA and SIPTO are using 3GPP accesses (LTE, UMTS, etc), and the NSWO is using the non-3GPP access (WLAN). Therefore, the control entities involved at the network side would be different. This may cause some potential conflicts in decision making. For example, the MME or SGSN, being unaware of UE's WLAN access status, would make a decision for the UE to offload via SIPTO by triggering a disconnection and reconnection operation. However, this would be a waste of network resources and signaling processing because UE can simply access the same service via NSWO.

Significant amount of processing at network side and UE side are wasted for the offloading action, e.g. UE needs to clean up the context and may even need to synchronize all the applications, apply other filter rules, rebind certain policies, etc; and the network side needs to remove session contexts with the old gateways, reselect the new gateway and establish all the corresponding connections, etc. Also, this unnecessary offloading action may cause adverse mobility impacts. For example, if the SIPTO offloading is towards a local network, it may cause additional handover or gateway relocation if the UE moves away from the current location.

One possible remedy to this is for the UE to decide the offloading mechanism to use, e.g. always use NSWO if available. However, with the existing network control offloading mechanism, e.g. SIPTO (NPD 1), the UE has to follow the defined re-connection operation. Otherwise, the UE may be detached from the network or loss the service. Also, there is no guarantee that the NSWO would always provide the better service than the SIPTO, e.g. when the non-3GPP access network is congested or the backhaul connection is congested.

It is a one non-limiting and exemplary embodiment of the disclosure to solve the above discussed problems. In particular, one non-limiting and exemplary embodiment provides a method and system to allow a more intelligent management of the offloading and connections, such that unnecessary signaling and processing could be avoided.

Solution to Problem

The present disclosure provides a method and apparatus that is able to decide on the proper type of offloading access to use based on both network side and terminal side information, wherein the network side provides additional information in a selective offload instruction that helps the UE to judge and confirm the suitable offloading access.

Accordingly, the present disclosure provides for an offloading method. The offloading method comprising the steps of: when the mobile terminal (for example, above-mentioned UE) starts offloading in a first network (for example WLAN, etc.), transmitting, by the mobile terminal, a first message to a mobility management device (for example, above-mentioned MME) performing mobility management of the mobile terminal in a second network (for example 3GPP, etc.), the first message including information indicating that the offloading is started; transmitting, by the mobility management device, a second message to the mobile terminal, the second message including selection information in the second network, the selection information being for selecting, on a basis of the first message, as to in which network offloading is to be performed; and deciding, by the mobile terminal, whether the offloading is to be maintained in the first network or whether new offloading is to be performed in the second network on a basis of the selection information included in the second message and judgment information in the first network that the mobile terminal has.

These general and specific aspects may be implemented using a system, an apparatus, and a computer program, and any combination of systems, apparatuses, and computer programs.

Advantageous Effects of Invention

The present disclosure has the advantage of achieving offloading goal without causing unnecessary procedure, signaling and resource consumption. It improves the user and network operator experience by allowing the UE to select the suitable offloading mechanism that provides better service and reduces mobility signaling and resource managements.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

BRIEF DESCRIPTION OF DRAWINGS

FIG. 7B is an example logic used by the Offload Control that supports the present disclosure;

DESCRIPTION OF EMBODIMENTS

Figure 1:
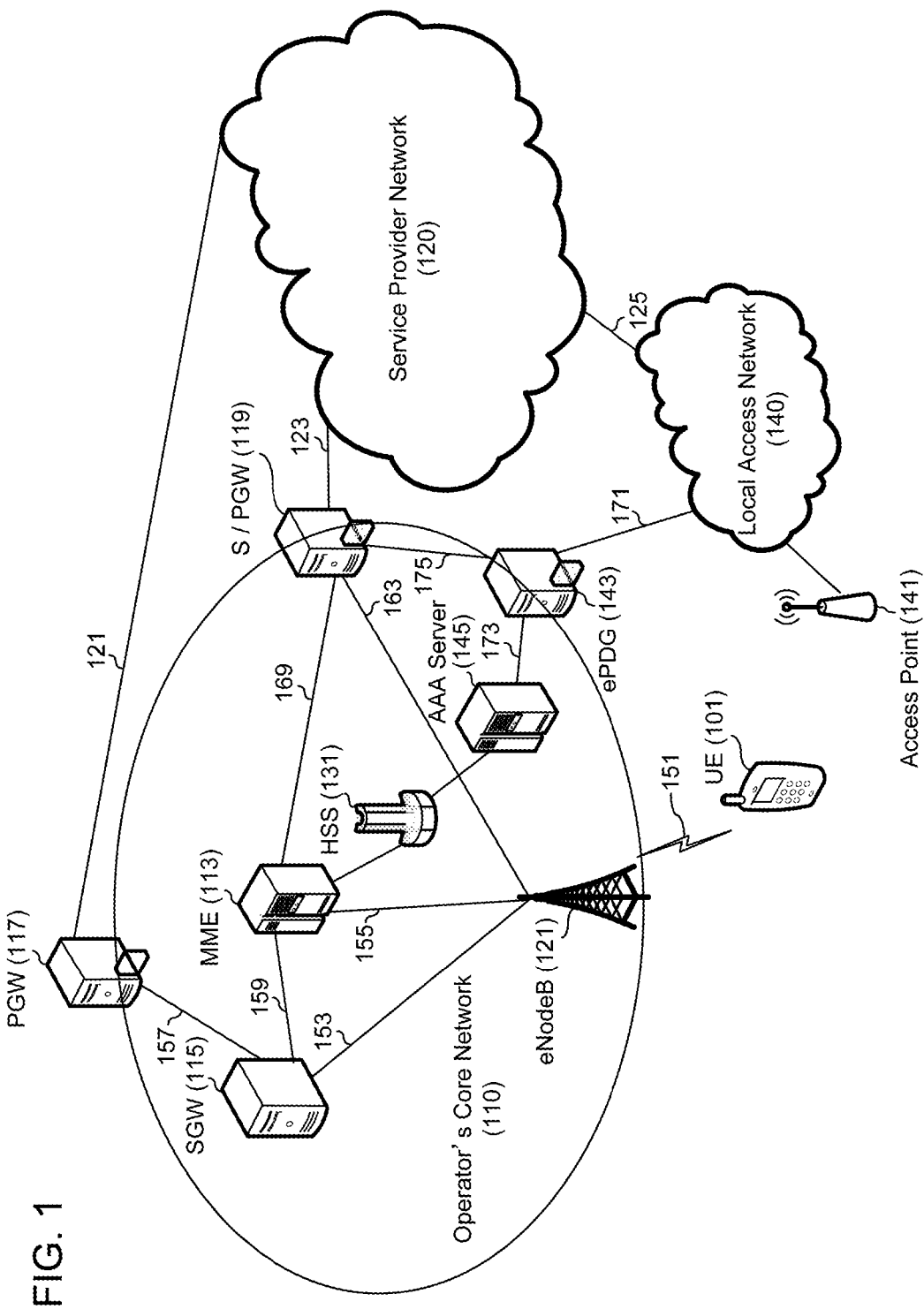
FIG. 1 is an example network architecture that supports the present disclosure.

First, the inventors considered as follows. Another possible approach is for the UE to accept the network decided offloading options, and then locally decide on whether to use it. However, this may still cause the additional signaling processing, which could be avoided if the UE stays with its original connection. In addition, by accepting the offloading, further unnecessary relocation may be required. For example, a UE on a train may accept to perform SIPTO offload when it stops at the train station where NSWO is also available. Even though the UE does not make use of the SIPTO connection, it would be required to perform relocation again when the train moves to another station, because the original SIPTO connection is not allowed by the network, as the gateway is too far away. The unnecessary relocation would continue if the train continues moving to new locations. This would obviously cause a major issue for the operation of the network and the UE.

Other example is that NSWO is available in the train, e.g. in-train wireless connection service. SIPTO offload may be indicated to the UE from network when the train arrives at a station for a stop. UE may want to either accept the indication for SIPTO if it can provide better Quality of Service (QoS) or stay NSWO because SIPTO QoS is not so sufficient. Especially for the latter case, the relocation, which was already performed by the network, would be again unnecessary and reserved resources wouldn't be used as the UE continues to use NSWO actually. Based on above, it is obvious that a better solution to the problem is necessary.

As a result of further studies, the inventors of the present disclosure conceived an idea of the management for the mobile terminal's connections according to an implementation of the present disclosure described below.

In the following description, for the purpose of explanation, specific numbers, times, structures, protocols, and other parameters are set forth in order to provide a thorough understanding of the present disclosure. However, it will be apparent to anyone skilled in the art that the present disclosure may be practiced without these specific details.

In the following description, for the purpose of explanation, the 3GPP Long Term Evolution (LTE) and Evolved Packet System (EPS) are used as example access technology and network architecture. However, it will be apparent to anyone skilled in the art that the present disclosure may be practiced with other access technology and network architecture under the same principle, e.g. GSM, GPRS, UMTS, LTE Advanced, etc. Also the WLAN are used as example of Non-3GPP access technology, however, it will be apparent to anyone skilled in the art that the present disclosure may be practiced with other access technology and network architecture under the same principle, e.g. WiMAX, Bluetooth, Ethernet, Dial-up line, etc.

In the description, LIPA, SIPTO, or NSWO is used as the example. However, it is obvious to anyone skilled in the art that the present disclosure can also be applied to other type of offloading mechanisms without major change to the general principles, e.g. direct communication between devices via no intermediate node.

(Embodiment 1: Basic Operation of the Disclosure)

With reference to FIG. 1, an example network configuration that the present disclosure can apply to is illustrated. As shown in the figure, a User Equipment (UE) (101) under the coverage of an eNodeB (121) is accessing some service provided by the Service Provider Network (120) via the Serving Gateway (SGW) (115) and PDN Gateway (PGW) (117), through the data link of 151, 153, 157, and 121. This connection is managed by an Operator's Core Network (110) control entity, Mobility Management Entity (MME) (113). The MME (113) controls the eNodeB (121) via interface 155, which allows signaling to the UE (101) as well. The MME (113) uses interface 159 to manage the SGW (115) that further controls the PGW (117) via interface 157. The MME (113) obtains the subscription information of the UE (101) from a central database in the Operator's Core Network (110), e.g. the HSS (131). Examples of the function entities and interfaces' operations are as described in [NPD 3].

As the UE (101) goes under the coverage of eNodeB (121), the MME (113) may decide that there is a better gateway entity, e.g. a combined SGW and PGW (S/PGW) (119), which can serve the UE (101) and avoid bringing the data traffic across the Operator's Core Network. This is achieved by locating the S/PGW (119) close to the eNodeB (121) and the exit point towards the Service Provider Network (120). The MME (113) decides on the S/PGW (119) to use based on the UE (101)'s subscription information that is obtained from the HSS (131), the operator's policy that is configured and managed by some operation management system, the location of the UE (101), the service accessed by the UE (101), etc. In order to relocate the gateway, the MME (113) would issue a command to release the UE (101)'s current connection(s) and trigger reconnection with the same service(s), for example using a Detach Request with an indicator of "reattach required" or a PDN disconnection request (Deactivate EPS Bearer Context Request) with an indicator of "reactivation required". Examples of the SIPTO operation details are provided in [NPD 1]. After the reconnection, the UE (101) would be accessing the service in the Service Provider Network (120) via the eNodeB (121) and S/PGW (119), through the link 151, 163, 123.

However, at the same time, the UE (101) is also under the coverage of the Wireless LAN (WLAN) Access Point (141), which also offers direct connection to the Service Provider Network (120) via the Local Access Network (140). Alternatively, the UE (101) may use the WLAN access to obtain service to the Service Provider Network (120) via the ePDG (143) and S/PGW (119), if seamless mobility is required. Some of the example operations of UE accessing the service via the WLAN access are provided in [NPD 2].

In order to obtain the access to the WLAN, the UE may need to go through some Authentication, Authorization and Accounting (AAA) procedures, which require the involvement of the AAA Server (145). In certain deployment, the Access Point (141) may have direct AAA connection towards the AAA Server (145) via certain AAA proxy, e.g. in the Interworking WLAN (I-WLAN) architecture, which is not shown in the FIG. 1 for simplicity reasons. In some other deployments, especially when the UE (101) accesses the service of the Service Provider Network (120) via the Local Access Network (140) directly, there may not be AAA procedure involving the AAA Server (145), e.g. the Local Access Network (140) is an open and free access, or some other local authorization mechanisms are used, e.g. user name and password, or captive portal, etc. This is especially possible with the Non-seamless WLAN Offload (NSWO) option as mentioned in [NPD 2].

Obviously, in this case, the UE (101) would have multiple options to access the same service in the Service Provider Network (120). Choosing the most proper and suitable option would allow the UE (101) to avoid unnecessary signaling and improve Quality of Service and user experience. On the other hand, it is clear that the control entities in the Operator's Core Network (110), e.g. the MME (113) or AAA Server (145), normally do not have the full information of all the access options. For example, the MME (113) is only in charge of the 3GPP access of the UE (101), and therefore is not aware of the UE (101)'s available connection options via the WLAN that is governed by the AAA Server (145). For the AAA Server (145), it only handles the non-3GPP access, e.g. the WLAN, and has no information about the 3GPP access over the eNodeB (121). Furthermore, in case of the NSWO, even the AAA Server (145) may not be aware of the direct access to the Service Provider Network (120) via the Local Access Network (140) because NSWO could be performed by UE directly based on policy/policies provided from ANDSF.

In this case, when the network control entities decide to initiate the Network Based Offloading, e.g. SIPTO, the Local Access Network (140) information would not be considered. For example, the MME (113) would still try to initiate the disconnection and reconnection procedure of SIPTO even if the UE (101) has already moved all the traffic over to the WLAN access according to its routing policies, e.g. Inter-System Routing Policy (ISRP) or Operator Policies for IP Interface Selection (OPIIS) rules.

It is obvious to anyone skilled in the art that the same situation happens with other 3GPP access technologies, e.g. UMTS. In UMTS, the corresponding network side control entity would be the SGSN, and the access node would be NodeB and RNC or BSS.

Figure 2:
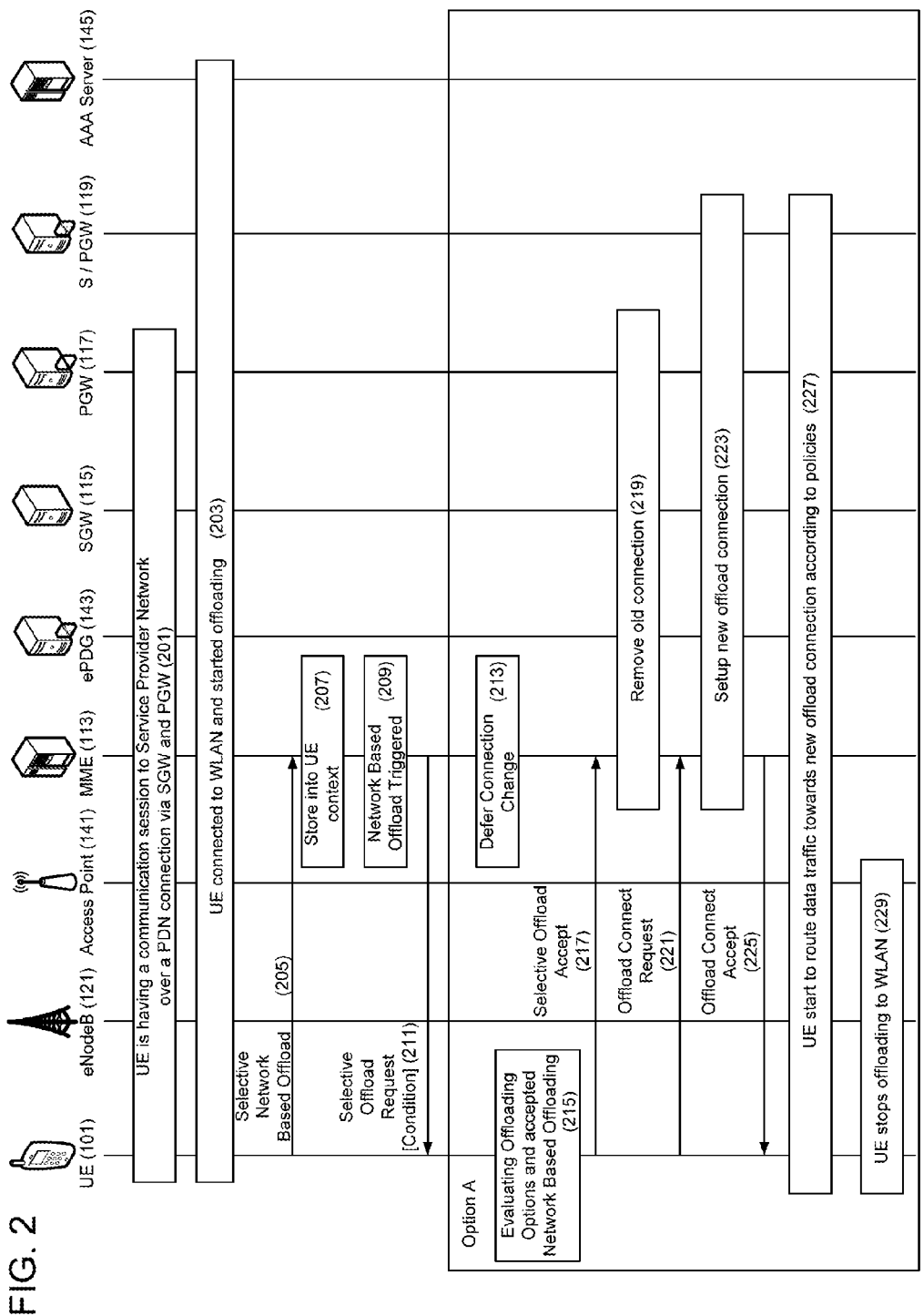
FIG. 2 is an example operation sequence of the present disclosure for handling the offloading when the network based offloading is preferred.

With reference to FIG. 2, an operation sequence of the present disclosure that resolves the issue is illustrated using the example architecture of FIG. 1.

As shown in FIG. 2, the UE (101) is having a communication session for a service in the Service Provider Network (120) via the SGW (115) and PGW (117), as in step 201. The communication session is carried over a PDN connection that is established according to the procedures defined in [NPD 3], assuming using a service identifier APN1. The UE (101) may also have other communication sessions and PDN connections at the same time. It is obvious to anyone skilled in the art that this does not affect the general principle of the present disclosure.

At the present location, the UE (101) also discovers that some non-3GPP access is available, e.g. the Wireless LAN access, through the Access Point (141), as in step 203. UE (101) may discover the non-3GPP access by performing some scanning triggered by user or base on Access Network Discovery and Selection Function (ANDSF) provided Access Network Discovery Information. It is obvious to anyone skilled in the art that the non-3GPP access can be of any form, not limited to wireless access technologies (e.g. wired access like Ethernet or USB based access technology), as long as it allows the UE (101) to access the Local Access Network (140). This does not affect the general principle of the present disclosure. In the following description, IEEE802.11 Wireless LAN (WLAN) access technology is used as the example of non-3GPP access for simplicity.

The UE (101) obtains network access via the WLAN Access Point (141). This may or may not require access control procedure, depending on the deployment choice of the Local Access Network (140). The UE (101) can use either its 3GPP identity, e.g. in case of an Interworking WLAN, or some other local credentials, e.g. in case of a locally operated WLAN, to gain access to the Local Access Network (140).

Based on some routing policy, e.g. the Inter-System Routing Policy (ISRP) or Operator Policies for IP Interface Selection (OPIIS) rules, or user preference settings, device configurations, etc, the UE (101) decides to move the data traffic of the communication session with Service Provider Network (120) to the WLAN access. This allows the data traffic to go through the path of Local Access Network directly to the Service Provider Network (120) without ever entering the Operator's Core Network (110). Alternatively, the connection could be established in such a way that it goes via the ePDG (143) and to the Service Provider Network (120) directly, in case ePDG (143) has direct connection with the Service Provider Network, or via the ePDG (143) and the S/PGW (119) that is located close to it. The type of actual path used depends on the routing policy applied. It is obvious to anyone skilled in the art that this does not affect the general principle of the disclosure.

It is obvious to anyone skilled in the art that the UE (101) may only obtain the access to the non-3GPP access after the policies decided that the data traffic should be routed via the WLAN access. This could be an implementation choice, provided the UE (101) can obtain necessary information of the WLAN access without establishing a connection, e.g. via IEEE802.11u or Hotspot2.0 defined technologies.

When the UE (101) observes that the traffic has been offloaded to the WLAN access, it would issue a Selective Network Based Offload Request (above-mentioned the first message) to the network control entity, e.g. the MME (113), as in step 205.

In case of the LTE system, the Selective Network Based Offload Request message could be implemented, for example, as the Tracking Area Update (TAU) message with a special indicator of "Selective SIPTO". Alternatively, the Selective Network Based Offload Request message could be implemented as the Request Bearer Resource Modification (RBRM) message, with a special indicator of "Selective SIPTO". In case of using the Request Bearer Resource Modification message, the indicator could be either a new Information Element, or as a new operation "Selective Offload" defined for the Traffic Aggregate Description (TAD). It is obvious to anyone skilled in the art that the UE (101) may implement both alternatives, and choose to use them according to connection status, e.g. use the TAU when there is only one PDN connections over the 3GPP access, and use the RBRM when there are multiple PDN connections over the 3GPP access to different Service Provider Networks (i.e. identified with difference APNs). Otherwise, the TAU could be used to indicate the Selective SIPTO for all the PDN connections the UE established, such that the indication can be performed once, i.e. with the aggregated indication for multiple PDN connections, which would reduce resource consumption in the system.

In case of UMTS system, the TAU could be replaced with the Routing Area Update (RAU) message, and the RBRM could be replaced with the Modify PDP Context Request (MPGR) message, as in [NPD 4].

It is obvious to anyone skilled in the art that the Selective Network Based Offload Request could be also implemented as an independent signaling message. This does not affect the general principle of the present disclosure.

It is obvious to anyone skilled in the art that the Selective Network Based Offload Request may involve further signaling between the MME (113) and the UE (101), e.g. a response from the MME (113) towards the UE (101), which is not shown in the FIG. 2. For example, when TAU is used in the implementation, the MME (113) would response with a TAU accept message. However, this does not affect the general principle of the present disclosure.

Once the MME (113) receives the Selective Network Based Offload Request, it stores corresponding information into the UE (101)'s context. For example, a special "selective" flag may be created with UE (101)'s context to indicate that the network based offloading, e.g. SIPTO, should be adaptive that allows changes according to situation. This could be either stored as a general flag for the UE (101), or as a specific flag for a particular PDN connection, depending on the implementation and deployment choice.

Other implementation would be for the "selective" flag in the UE's context to be created during UE's attach procedure, where UE's subscription containing information whether to allow Selective Network Based Offload provided from HSS to MME while the attach procedure being performed. If the UE is allowed to apply Selective Network Based Offload based on the provided subscription, the MME creates the "selective" flag (or corresponding information) in UE's context. Therefore, the UE does not need to send Selective Network Based Offload Request, so that it would reduce traffic and resource consumption in the network.

At certain point of time, the MME (113) is triggered to perform a network based offloading, e.g. SIPTO, as in step 209. The trigger could be based on the updates of the UE (101)'s location information, network operator's policy, or the configuration on the SGW (115) or PGW (117). In case the UE (101) is in CONNECTED state, the location information update may be a Path Switch Request or a Handover Notify during the handover procedure or the TAU after the handover procedure. In case the UE (101) is in IDLE state, the location information update may be the TAU.

It is obvious to anyone skilled in the art that the Selective Network Based Offload Request in step 205 may also serve as an update of UE (101)'s location information. This does not affect the general principle of the present disclosure.

When the MME (113) decides that a network based offloading should be carried out, and it notices the "selective" flag in the UE (101)'s context, it would send a Selective Offload Request message (above-mentioned the second message) to the UE with additional "Offload Condition" information (above-mentioned the selection information) about the potential offloading, as in step 211.

In case of LTE system, the Selective Offload Request could be the Detach Request with an indicator of "selective reattach requested" or a PDN disconnection request (Deactivate EPS Bearer Context Request) with an indicator of "selective reactivation requested". The Detach Request or the Deactivate EPS Bearer Context Request further includes the "Offload Condition" information element. In an alternative operation, the presence of the additional "Offload Condition" indicates the "selective" meaning, i.e. the offloading decision can be changed according to UE's actual status. In that case, the indicators in Detach Request and Deactivate EPS Bearer Context Request could be simply the already defined "reattach requested" and "reactivation requested" cause value.

In case of the UMTS system, the Selective Offload Request could be the Deactivate PDP Context Request message.

The "Offload Condition" information element is used by the MME (113) to indicate to the UE (101) the potential operation parameters when the connection is offloaded using network based offloading mechanism, e.g. SIPTO. This is to help the UE (101) to make corresponding decisions on which offloading option to use. An example of the contents in "Offload Condition" is shown below:

```
{Offload Condition} ::=  { QoS Component ::=
                              {Maximum Bit Rate Allowed}
                              {Minimum Bit Rate Offered}
                              {Delay Allowance}
                              {QCI}
                              {Priority}
                              {ARP} }
                          {Time Limit Component}
                          {Range Limit Component}
                          {Size Limit Component}
```

Wherein, the {QoS Component} is the connection quality parameters expected to be offered by the SIPTO connection. It may include for example, {Maximum Bit Rate Allowed} that indicates the maximum throughput allowed over the SIPTO connection, {Minimum Bit Rate Offered} that indicates the throughput that can be guaranteed over the SIPTO connection, {Delay Allowance} that indicates the delay expected over the SIPTO connection, {QCI} that indicates the QoS Class Identifier expected to be allocated to the SIPTO connection, {Priority} that indicates the priority to be allocated to the SIPTO connection, and {ARP} that indicates access preemption level for the UE over the SIPTO connection.

It is obvious to anyone skilled in the art that the {QoS Component} may also contain other parameters that can serve as decision making criteria, e.g. whether the same APN would be used, whether service interruption like packet drop would be expected, or whether IP address preservation would be supported after offloading, etc.

The {Time Limit Component} is time related parameter for the SIPTO connection. For example, it may indicate the expected length allowed for the connection given the current moving speed of the UE (101). It may also include the information about the time of the day that the SIPTO connection would be allowed.

The {Range Limit Component} is the coverage area related parameter that indicates the area that the SIPTO connection would be valid. For example, it may indicate that the SIPTO connection is only accessible within the cell, or within 1 km. This may help the UE (101) to gauge the possibility of losing SIPTO connection.

The {Size Limit Component} is the parameter that indicates the allowable volume of data traffic over the SIPTO connection. For example, it may indicate that the SIPTO connection allows 5 GB of data traffic.

It is obvious to anyone skilled in the art that the "Offload Condition" does not need to contain all the information listed above, and it may include additional information about the offloading. This does not affect the general principle of the disclosure.

Also, the UE may make a decision considering other conditions on the UE which are locally available. For example, when the UE connects to in-train WLAN access service in a train for NSWO to internet and the train temporarily stops at a station. It might be better to keep NSWO via in-train access network for the short stop even if the Selective Offload Request is received from the MME, because the SIPTO connection may not suit the case when the train leaves the station. For example, the train may run at very high speed, and thus the 3G connection condition would be sometimes not so good and may degrade performance of the service over it. Whereas, the in-train WLAN access can keep a good condition for the offloading access. In this case, the UE may follow some local policy from the in-train WLAN or the user input to select NSWO.

Other example for the selection criteria would be whether address change is accepted or not for the UE. Because of existing offloading mechanism, each offloading connection has different contact IP address for user traffic, thus user applications on the UE normally have to change IP address for the communication when the UE changes offload connection, i.e. between SIPTO and NSWO. Since some applications, especially those communicating to other node(s), may not survive IP address changes during their life time, the UE may want to keep NSWO for the communication or at least for those application traffic(s). In this case, the UE may have decision made without considering the contents in the Offload Condition. This provides users the benefit of keeping session continuous even when the SIPTO is triggered.

The MME may obtain the contents of the Offload Condition from a target PGW of the SIPTO connection being established. This is because the MME could know the target PGW based on UE's location in advance, and it also could contact the gateway even before actual SIPTO connection establishment procedure. Otherwise, the MME may identify possible performance of the SIPTO connection based on other UE's contexts stored in the MME (or also in other MMEs for MME relocation case). For example, the MME would find from its context database any SIPTO connections of other UEs which have similar or same characteristics, e.g. with regard to UE's location, target APN, target PGW, Group ID for UE subscription, QCI value, etc., and identify possible parameters, e.g. QoS and/or other components described above, for the Offload Condition from the results.

As shown in the FIG. 2, the following operations from step 213 towards 229 are for the case when the UE (101) choose to follow the Network Based Offloading, indicated as "Option A".

When the MME (113) sends the Selective Offload Request (211) message towards the UE (101), it knows that the UE (101) may not choose to follow the Network Based Offloading. Therefore, the MME (113) would defer the required network side operation related to the offloading, as in step 213. For example, the MME (113) would not instruct the SGW (115) and PGW (117) to remove the PDN connections, and it would also not instruct the eNodeB (121) to remove the S1 connection and the radio bearers.

On the UE (101) side, when the Selective Offload Request (211) arrives, the UE (101) starts to evaluating the offloading options, as indicated in step 215. The UE (101) performs the evaluation by first obtaining the "Offload Condition" parameters from the message, and then obtaining the corresponding parameters from the WLAN access through the Access Point (141). The mechanism for the UE (101) to obtain the information is access technology dependent. For example, when the WLAN support IEEE802.11u [NPD 5], the UE (101) can use the Generic Advertisement Service (GAS) to obtain information about the WLAN and the Local Access Network (140), even without associating with the WLAN.

With GAS, the UE (101) is able to know the operation parameters of the offloading via the WLAN Access Point (141), e.g. the backhaul link status towards the Service Provider Network (120), the load of the WLAN itself, the coverage area of the Local Access Network (140) that allows UE (101) to roam and keep the same offloading, which Operator's Core Network is connected to the Local Access Network (140), any special roaming arrangement with the Operator's Core Network (110), valid period of the above information, etc. The UE (101) may also obtain other relevant operating information of the WLAN using the IEEE802.11u [NPD 5] functions, e.g. whether the security level of the WLAN is sufficient, whether emergency service is supported, the QoS mappings between the Local Access Network (140) and the Service Provider Network (120) or Operator's Core Network (110), etc. It is obvious to anyone skilled in the art that the UE (101) may also obtain additional information from the WLAN when the WLAN network operator choose to provision it according to the Hotspot2.0 defined by WiFi Alliance. This does not affect the general principle of this invention.

In case the UE (101) has received the "Offload Condition" information element in the Selective Offload Request message, it can inquire only the related information indicated in the "Offload Condition". In case the UE (101) has already connected to the WLAN before receiving the Selective Offload Request message, it may have already obtained the related information. The UE (101) can choose to use the stored information directly for offloading evaluation if the valid period has not expired, or query the WLAN Access Point (141) to obtain new set of information elements.

The UE (101) may utilize different logic to evaluate the offloading options. For example, the UE (101) may have some operator rules provisioned by the ANDSF and some user specified preferences rules. Such rules may state that WLAN offloading, e.g. NSWO, should be used for the traffic if the WLAN Access Point is less than 80 percent loaded (e.g. as an access network congestion condition information), or has less than 20 associated clients (e.g. as an access point congestion condition information). The rule may also state that the WLAN offloading should only be chosen if the backhaul link is not congested, or meets certain security criteria, e.g. using a predefined level of authentication and encryption mechanism. It is obvious to anyone skilled in the art that there may be other type of rules and configurations, e.g. always use WLAN offloading if the service bandwidth or size of contents exceeds certain limit, always use WLAN offloading if the service priority is lower than certain level, always use WLAN offloading if the UE (101) is currently of low mobility, etc. It is obvious to anyone skilled in the art that such operator rules may also be provisioned to the UE (101) via other means, e.g. as part of the Interworking WLAN Management Object via OMA-DM, or as part of the Hotspot2.0 Management Object delivered through the WLAN.

On the other hand, the "Offload Condition" parameters would also be used together with the rules above to evaluate the offloading options. For example, the {Size Limit Component} could be used for as the threshold for deciding if WLAN offloading should be used. Alternatively, the existence of the corresponding parameters in the "Offload Condition" information element is an indication that such parameters should be used in the evaluation. For example, if the "Offload Condition" contains the QoS related parameter {Maximum Bit Rate Allowed}, it means that the operator would recommend the UE (101) to only choose WLAN offloading if the WLAN can offer a link rate that is higher than the indicated {Maximum Bit Rate Allowed} value. UE (101) would then obtain the effective link rates of the WLAN and potentially the backhaul link rates using the GAS. The UE (101) compares the rates against the {Maximum Bit Rate Allowed}, and decide whether the WLAN offloading should be chosen over SIPTO. It is obvious to anyone skilled in the art that similar operation could be taken over other parameters, e.g. {Priority}, {Time Limit Component}, {Range Limit Component}, etc.

In case the UE (101) decide that the Network Based Offloading is preferred, as in step 215, it sends a Selective Offload Accept (217) message back to the MME (113), as in step 217. In case of LTE system, this could be the Detach Accept message or Deactivate EPS Bearer Context Accept message.

Upon receiving the Selective Offload Accept (217), the MME (113) would then start the network side offloading preparation procedures, e.g. removing the network side connection from the SGW (115) and PGW (117), as in step 219. The MME (113) may also choose to keep and reuse the signaling connection for the UE with eNodeB (121), by not releasing the S1-MME connection or sending a special S1 Release Command with cause code indicating that reconnection is expected.

The UE (101) would send an Offload Connect Request message, as in step 221, any time after step 217. In this Offload Connect Request message, UE (101) indicates that this is for the network based offloading reconnection. In case of LTE, this could be a new Attach Request with the same parameters of the just detached connection, i.e. APN, etc. In order to save some signaling and processing, the UE (101) and eNodeB (121) may have preserved the previous connection's resources, e.g. RRC connection, S1-MME connection, etc. In this case, the new Offload Connect Request would be just delivered over them, without performing additional RRC or S1 connection establishment procedures.

Upon receiving the Offload Connect Request (221), the MME (113) would start to establish the offloading connection, as in step 223, e.g. the SIPTO connection via the S/PGW (119). This may involve the gateway selection procedure, which makes use of the information carried by the Offload Connect Request (221), e.g. the location information of the UE (101). It is obvious to anyone skilled in the art that this procedure (223) may also includes the MME (113) instructing the eNodeB (113) on the creation of UE (101) contexts or establishment of the necessary bearers, which is not shown in the figure.

The MME (113) would then respond to the UE (101) with an Offload Connect Accept (225) when the SIPTO connection setup is successful, as in step 225. In LTE case, this could be the Attach Accept or the PDN Connectivity Accept message.

It is obvious to anyone skilled in the art that there may be other signaling message exchanges involved in the process between step 221 and 227. For example, there may be authentication procedure involved, and the UE may also respond with a PDN Connectivity Complete message after step 225. However, these do not affect the general principle of the present disclosure.

After receiving the Offload Connection Accept (225), the UE (101) starts to route the traffic towards the new offloading connection according to the routing policies, as in step 227. The UE (101) would also then stops to offload to the WLAN connection according to the routing policies, as in step 229. It is obvious to anyone skilled in the art that at step 229, the UE (101) may or may not keep the WLAN connection on depending on whether there are other services using the WLAN access.

Figure 3:
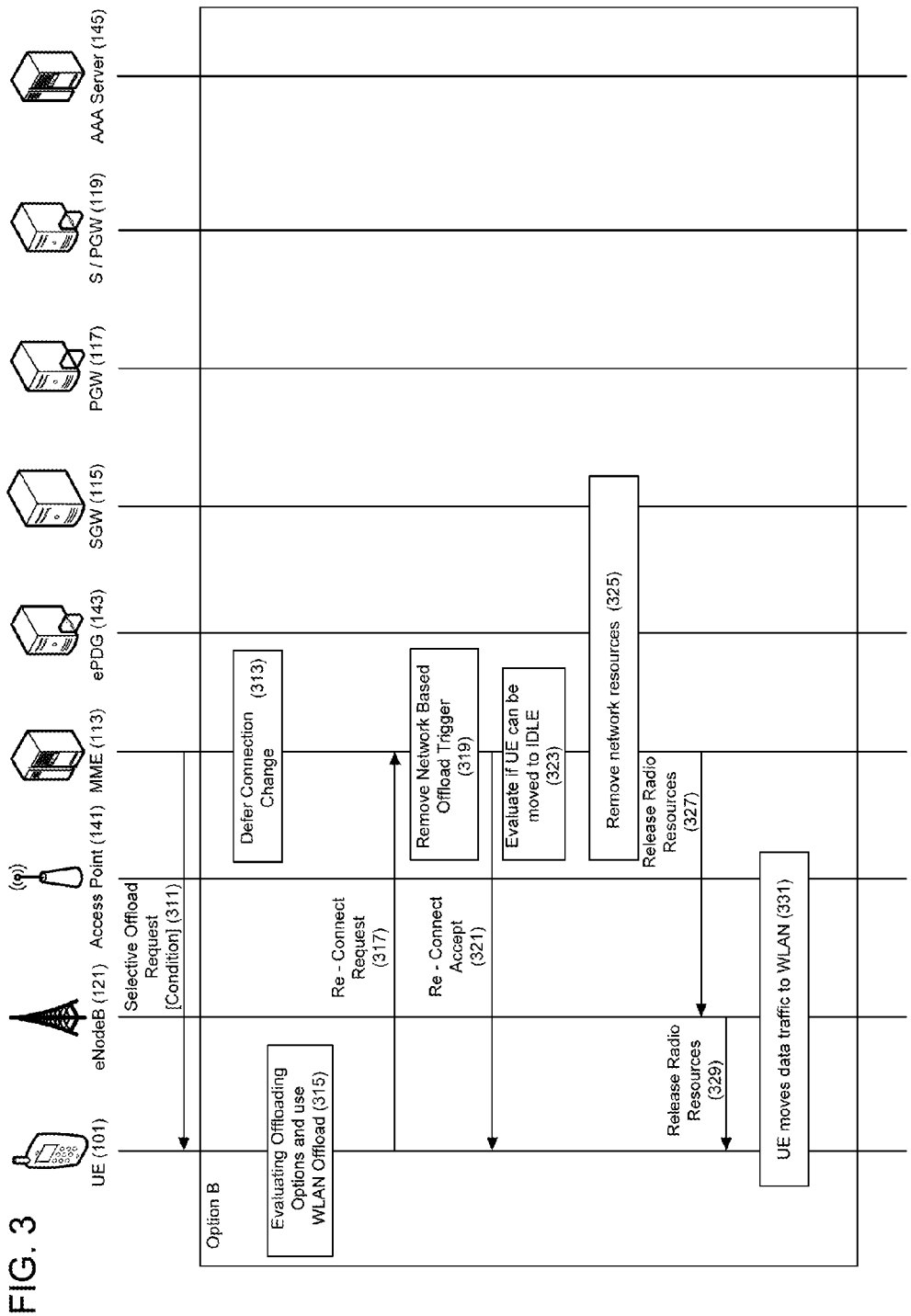
FIG. 3 is an example operation sequence of the present disclosure for handling the offloading when the WLAN based offloading is preferred.

With reference to FIG. 3, an alternative operation of the present disclosure when UE (101) evaluates that the WLAN offloading is preferred at step 315 is illustrated. As shown in the FIG. 3, the "Option B" part is meant to replace the operation of "Option A" of FIG. 2. The rest of the options are identical for this alternative operation and that shown in the FIG. 2, and therefore are not shown in full in FIG. 3.

As shown in the figure, step 311 and step 313 are identical to that of step 211 and 213. At step 315, the UE (101) evaluates the offloading options similar to that of step 215. However, the result of the evaluation in this case is that the WLAN offload is preferred. Therefore, in this case, the UE (101) does not send any Selective Offload Accept (217) message. Instead, the UE (101) sends directly a Re-Connect Request message back to MME (113), as in step 317. This Re-Connect Request message could be simply an Attach Request or PDN Connectivity Request with the same APN and other parameters of the connection indicated for detach/disconnect in step 311. In this case, this message may be identical to that of step 221. Depends on the operation mode, the Re-Connect Request message could also be the TAU or RAU message. Alternative, the UE (101) may include additional flag or parameters to indicate to MME (113) explicitly that this is requesting to continue using the existing 3GPP connection without performing offloading.

Upon receiving the Re-Connect Request (317), the MME (113) becomes aware that the UE (101) has chosen to use the WLAN offload instead of the SIPTO. Therefore, the MME (113) would start to remove the Network Based Offload Trigger, as in step 319. The MME (113) would also remove any pending actions that have been deferred in step 313, i.e. as if the SIPTO has never been triggered. The MME (113) would then send back a Re-Connect Accept message towards the UE (101), as in step 321. In LTE system, this could be the Attach Accept or the PDN Connectivity Accept. It is obvious to anyone skilled in the art that the step may also include some additional signaling towards the other network side nodes, e.g. eNodeB (121).

At the same time, the MME (113) would evaluate if the UE would be moved to IDLE mode, i.e. all the traffic could be moved to WLAN connection. This could be based on the current service/connection established by the UE (101), and additional indication in the Re-Connect Request (317) message. For example, the Re-Connect Request (317) may include some explicitly indicator that the UE (101) evaluated that all its traffic can be send over the WLAN connection, and therefore the 3GPP connection would not be used. If the MME (113) decides that the UE (101) no longer needs the 3GPP connection, it would start to perform the MME initiated S1 release procedure, which would move the UE (101) into IDLE mode, as in step 325, 327, and 329. This allows the UE to save power and the eNB to save resources for the UE. At this time, the UE (101) would then move the data traffic towards the WLAN access, as in step 331, according to the routing policies.

It is obvious to anyone skilled in the art that FIG. 2 and FIG. 3 together represented the present disclosure. The system may perform either operations as in FIG. 2 or operations in FIG. 2 with the "Option A" portion replaced by the "Option B" portion in FIG. 3.

The UE (101) may send a Selective Network Based Offload message to the MME (113) with an "Offload Information" element to inform the MME of some condition or threshold (above-mentioned the threshold information), e.g. on some QoS parameter(s), for the MME to initiate Selective Offload Request in the MME. The UE can create the Offload Information based on current WLAN access performance.

For example, the UE refers the WLAN access performance and set the parameters in the Offload Information so as for the MME to initiate the Selective Offload Request only when the performance is better than WLAN access. The MME checks the contents of Offload Information provided from the UE and stores them into UE's context. When detecting SIPTO initiation for the UE, the MME checks if the condition is satisfied based on the stored Offload Information and obtained SIPTO Offload Condition information. If the condition is satisfied, the MME provides Selective Network Based Offload Request to the UE. Otherwise the MME ignores the SIPTO initiation and skip sending the Selective Network Based Offload Request. Therefore, the MME can avoid inefficient Selective Offload (SIPTO) initiation (i.e. the MME only initiates useful Selective Offload), such that unnecessary resource consumption will be reduced.

Also the UE can also inform the MME via Selective Network Based Offload message about required performance parameters in Selective Offload Request message possibly being provided later. Therefore, the UE can receive only parameters which can be compared with corresponding one related to the WLAN access system. This will reduce UE's processing load and time to decide which offload mechanism is appropriate, and also MME's processing load and time to prepare unnecessary parameters which should be avoided.

(Embodiment 2: Example UE Implementations)

Figure 4:
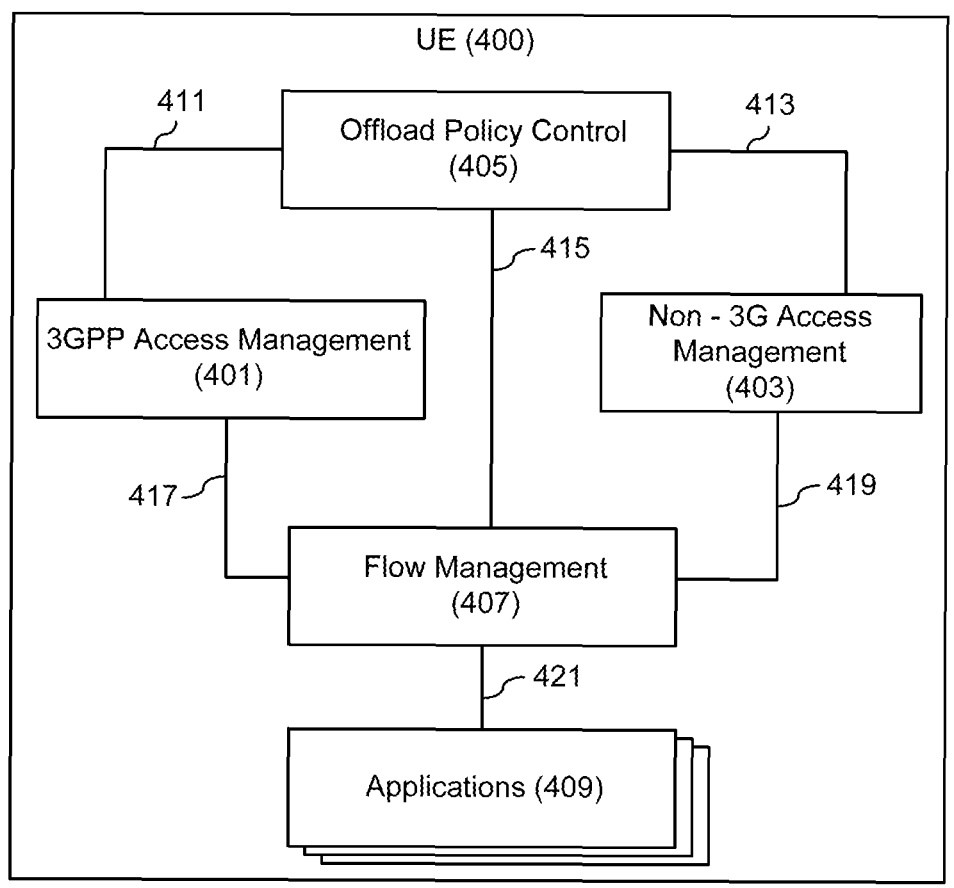
FIG. 4 is an example function structure of a UE that supports the present disclosure.

With reference to FIG. 4, an example architecture of the UE (101) that supports the present disclosure is illustrated. As shown in the figure, the UE (400) comprises five major functional components, namely, the 3GPP Access Management (401), the Non-3GPP Access Management (403), the Offload Policy Control (405), the Flow Management (407), and the Application (409).

Among them, the 3GPP Access Management (401) and the Non-3GPP Access Management (403) are the function modules that handle the 3GPP Access and Non-3GPP Access respectively. They are in charge of sending and receiving data or signaling traffic over these corresponding accesses and managing the access according to the signaling.

The Offload Policy Control (405) is the entity that decides and controls which access is to be used for the offloading of the traffic. It obtains information from both the 3GPP Access Management (401) and Non-3G Access Management (402), and performs the evaluation and decides on which type of offloading should be used. The Offload Policy Control (405) would also send commands to the 3GPP Access Management (401) and Non-3G Access Management (402), such that the proper offloading actions could be taken. For example, the Offload Policy Control (405) may request the Non-3G Access Management (402) to establish the WLAN connection if it is decided that WLAN offloading should be used. Or, it may instruct the 3GPP Access Management (401) to perform some connection establishment with a APN linked to offloading, if the 3GPP access based offloading should be used.

The Flow Management (407) is in charge of deciding on the route to use for the data traffic generated by the Applications (409). The Flow Management (407) may make use of for example the ISRP or OPIIS rules provisioned by ANDSF or user configurations to decide on how the traffic should be routed, or whether it can be offloaded if not bound to certain APN. The Offload Policy Control (405) may also provide indication or trigger for the Flow Management (407) to adjust it is rules and review the current routing decisions.

For example, when the NSWO becomes available, the Offload Policy Control (405) will inform the Flow Management (407) to activate the corresponding routing rules, such that data traffic could be diverted to the WLAN access.

When Flow Management (407) decides to initiate NSWO, it indicates the Offload Policy Control (405) to provide information indicating that the UE started NSWO such that SIPTO initiation should be selective (adaptive) to the MME. Then, the Offload Policy Control (405) sends the Selective Network Based Offload Request to the MME.

Figure 5:
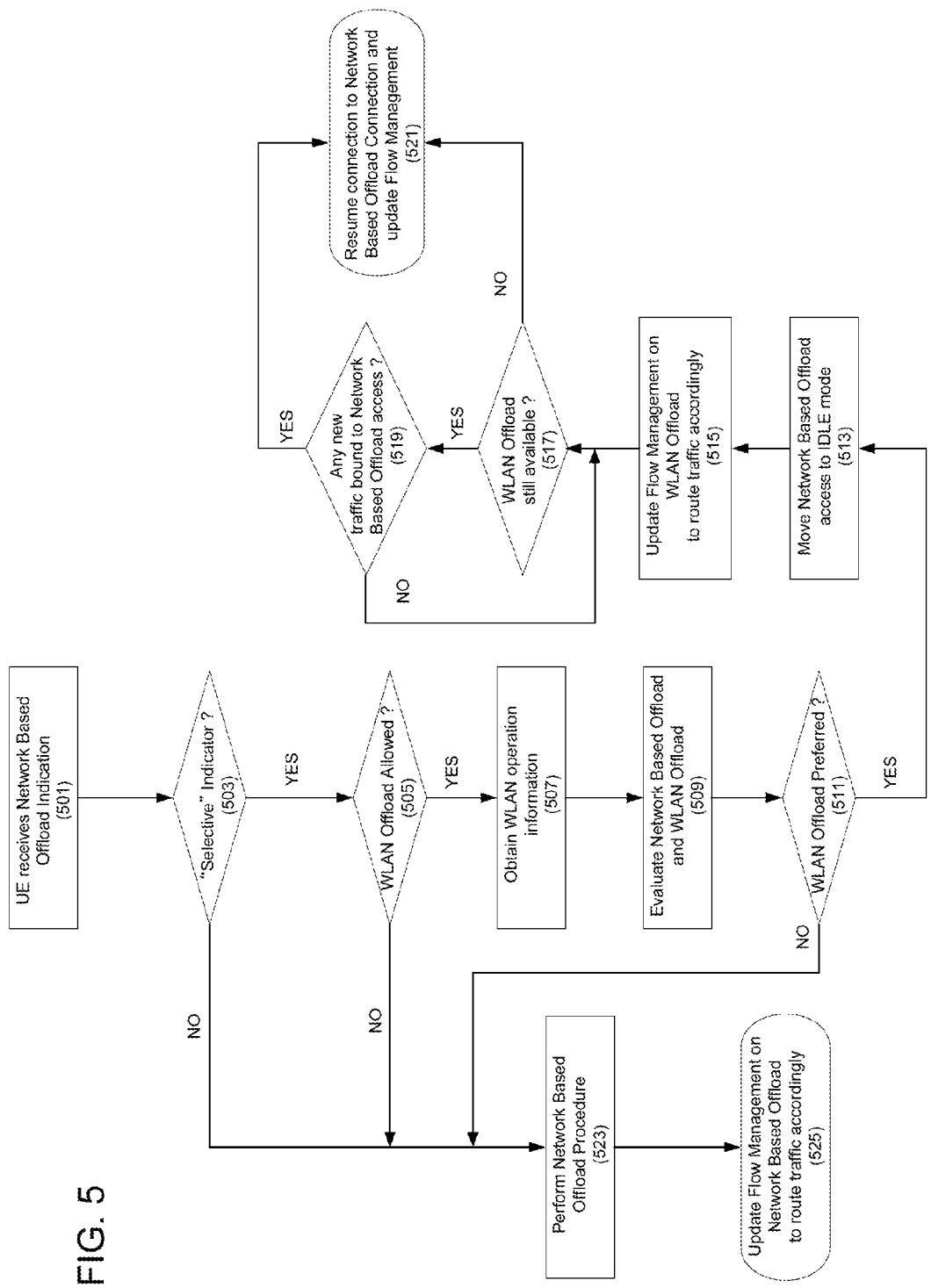
FIG. 5 is an example logic used by the UE that supports the present disclosure to manage the offloading.

With reference to FIG. 5, an example logic used by the Offload Policy Control (405) is presented. As shown in the figure, when the UE (400) receives the Network Based Offload indication, e.g. the Selective Offload Request in step 211 and by the 3GPP Access Management (401) to the Offload Policy Control (405), as in step 501, the Offload Policy Control (405) would check whether this is a "selective" request, i.e. the offloading decision could be adaptive based on UE's status. This is achieved by for example checking the explicit flag in the Selective Offload Request (211 or 311) or the existence of the "Offload Condition" information element.

If the request is "selective", i.e. indicated by the explicit flag or the "Offload Condition", the Offload Policy Control (405) would proceed to check if the WLAN Offload is forbidden by configuration or policies. This is achieved by checking the Non-3G Access Management (403) and the Flow Management (407). For example, the Non-3G Access Management (403) may provide information on whether the WLAN is available or whether it provides connection to the desired Service Provider Network (120), which is obtained using the IEEE802.11u GAS feature. On the other hand, the Flow Management (407) may contain rules that indicate the particular service is not allowed over WLAN access, or it should be offloaded to WLAN using a PDN connection via ePDG or NSWO.

In case the Offload Policy Control (405) decides that WLAN Offload is allowed at step 505, it would instruct the Non-3G Access Management (403) to obtain the WLAN operation parameters related to offloading. For example, this may include the link rate, the backhaul link rate, the load of the WLAN, the number of terminals connected to the same access point, the bandwidth allocated by the access point, the power level needed for transmission, etc. At the same time, the Offload Policy Control (405) would also obtain the parameters in the received "Offload Condition". It would then instruct the Non-3G Access Management (403) to obtain the corresponding WLAN access parameters.

After obtaining the necessary information, the Offload Policy Control (405) would then start to evaluate the offloading options by comparing the parameters, as in step 509. This is similar to the actions as described for step 215 or 315. In addition, the Offload Policy Control (405) may further evaluate the options by considering the power consumption projection, the Application layer requirements, the moving speed of the UE (400), the range of the current WLAN access, user inputs, the number of handovers experienced, etc.

The Offload Policy Control (405) would then check if the evaluation prefers the WLAN Offload, comparing to the SIPTO offered with the "Offload Condition" parameters, as in step 511. If the WLAN Offload is preferred, the Offload Policy Control (405) would start to move the network based offload access to IDLE, e.g. by rejecting the SITPO option as in step 317. It is obvious to anyone skilled in the art that this does not necessary require the UE (101) to change its 3GPP access to IDLE mode, if there are other services using the 3GPP access. It simply removes the trigger for the offloading at the MME (113), and moves the data traffic off the PDN connection.

The Offload Policy Control (405) would further update the Flow Management (407) regarding the availability of the WLAN Offload, and triggers it to review the filtering rules, such that the data traffic could be routed accordingly to the WLAN access, as in step 517.

The Offload Policy Control (405) may also occasionally check whether the WLAN Offload is still available, as in step 517, and whether there is any new traffic generated by the Application (409) that is classified by the Flow Management (407) as not suitable for WLAN Offload, as in step 519.

The WLAN Offload may become not available due to different reasons, e.g. the UE (101) moves out of the WLAN coverage, some congestion happened on the backhaul, overloaded wireless channel, persistent noise or interference over the wireless channel, etc. This condition could be informed by the Non-3G Access Management (403) to the Offload Policy Control (405).

As new Applications (409) may be initiated, different data traffic could be generated as well. Some of the new traffic may be filtered according to the routing rules and policies in the Flow Management (407) and decided to be only suitable for the network based offload connection, for example, a specific APN is bound to the service, or a certain priority requires the service to go via 3GPP connections, etc.

In such cases, the Offload Policy Control (405) function would try to resume the connection to the network based offload connections, as in step 521, e.g. by either perform the Attach, TAU, or Service Request procedures when appropriate according to [NPD 3].

At step 503, 505, and 511, if the evaluation is that the WLAN Offload is not suitable, the Offload Policy Control (405) would then perform the procedure to activate the Network Based Offload, as in step 523, and inform the Flow Management (407) to adjust the filter rules and policies such that the traffic could be routed properly, as in step 525. This is similar to the operation as in FIG. 2 step 217 to 229.

It is obvious to anyone skilled in the art that the logic shown in FIG. 5 may further contain other aspects, for example the step 517 may also contain the operation of re-evaluate the offloading operations, as in step 509. This may be useful when the WLAN connection is still available but operation parameter has changed. This does not affect the general principle of the present disclosure.

(Embodiment 3: Example MME Implementations)

Figure 6:
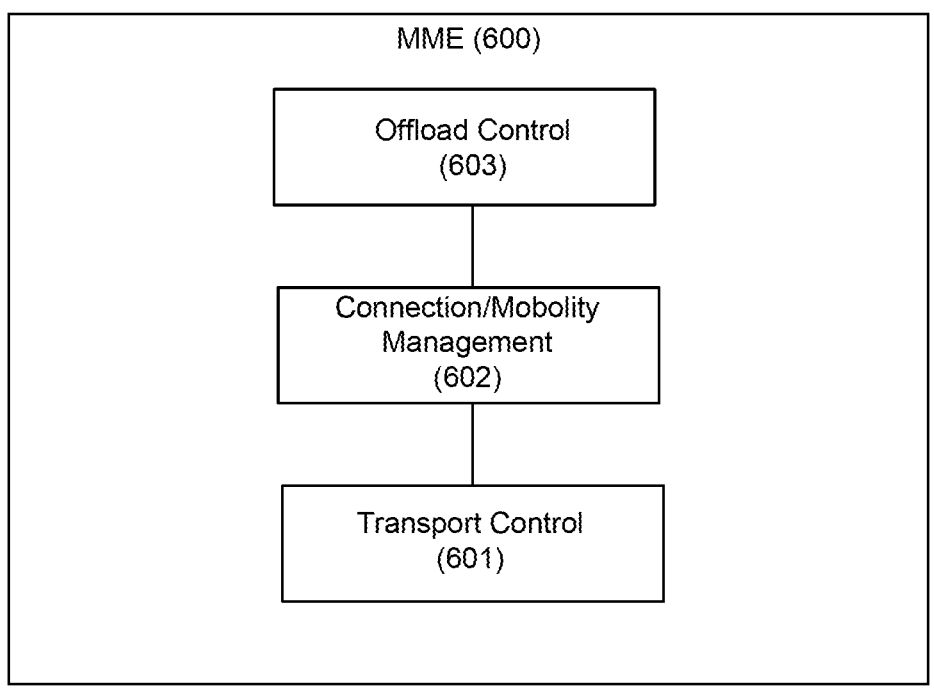
FIG. 6 is an example function structure of a MME that supports the present disclosure.

With reference to FIG. 6, an example architecture of the MME (600) that supports the present disclosure is illustrated. As shown in the figure, the MME (600) comprises tree major functional components, namely, the Transport Control 601, the Connection/Mobility Management 602 and the Offload Control 603.

The Transport Control 601 is the function module that provides transport service to communicate with other 3GPP network entities, e.g. Serving Gateway, eNB (base station), HSS (Home Subscriber Service), so that any signalling to maintain UE's connection and mobility can be exchanged with the entities. The Transport Control 601 could implement several communication interfaces such as S1, S6, S11 for signalling transmission (i.e. sending and receiving signaling messages). The Connection/Mobility Management 602 maintains UE's connection and mobility management, so that it processes related signaling messages for the management such as NAS exchanges with UE and also maintains UE context. The Offload Control 603 decides initiation of the network based offloading and handles the process, i.e. to disconnect existing UE's target connection and force to reconnect for offload traffic.

Figure 7A:
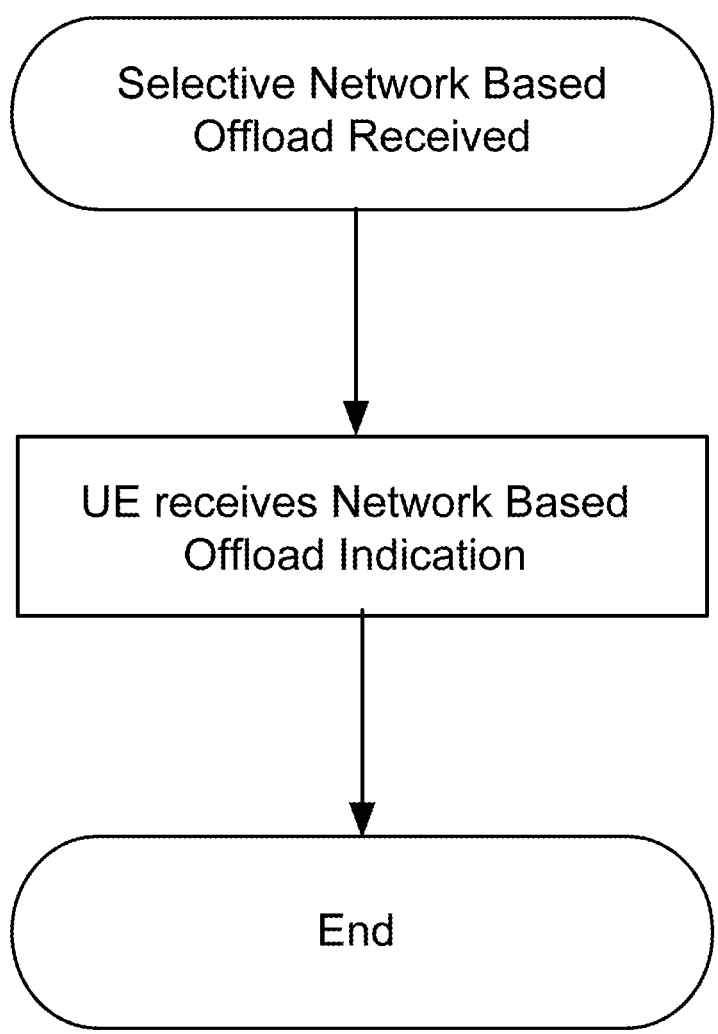
FIG. 7A is an example logic used by the Offload Control that supports the present disclosure.

With reference to FIG. 7A, 7B, an example logic used by the Offload Control 603 is presented. As shown firstly in the FIG. 7A, when the MME receives the Selective Network Based Offload Request from UE, it stores corresponding information into the UE (101)'s context in the Connection/Mobility Management entity 602. For example, a special "selective" flag may be created with UE (101)'s context to indicate that the network based offloading, e.g. SIPTO, should be selective. This could be either stored as a general flag for the UE (101), or as a specific flag for a particular PDN connection, depending on the implementation and deployment choice.

Afterwards, as shown in the FIG. 7b, at certain point of time, the MME (113) was triggered to perform a network based offloading, e.g. SIPTO. The trigger could be based on the updates of the UE (101)'s location information, network operator's policy, or the configuration on the SGW (115) or PGW (117). When the MME (113) decides that a network based offloading should be carried out, and if the MME notices the "selective" flag in the UE (101)'s context, it would send a Selective Offload Request message to the UE with additional "Offload Condition" information about the potential offloading as described in the previous embodiment. Otherwise, the MME just performs normal process for the network based offloading.

The MME would obtain the contents of the Offload Condition from a target PGW of the SIPTO connection being established and prepare bearer information for offload. Otherwise, the MME may identify possible bearer information of the SIPTO connection based on other UE's contexts stored in the Connection/Mobility Management 602 (or maybe in other MMEs for MME relocation case). For example, the MME would find from its context database any SIPTO connections of other UEs which has similar or same characteristic, e.g. with regard to UE's location, target APN, target PGW, Group ID for UE subscription, QCI value, etc., and identify possible parameters, e.g. QoS and/or other components described above, for the Offload Condition from the results.

The MME (113) sends the Selective Offload Request (211) message towards the UE (101). It can be noted that since the MME already knows that the UE (101) may not choose to follow the Network Based Offloading, the MME (113) would defer the required network side operation related to the offloading. For example, the MME (113) would not instruct the SGW (115) and PGW (117) to remove the PDN connections, and it would also not instruct the eNodeB (121) to remove the S1 connection and the radio bearers.

From procedural perspective, the MME would receive either Selective offload accept or Re-connect Request message from UE for next. Upon receiving the Selective Offload Accept (217), the MME (113) would then start to network side offloading preparation procedures, e.g. removing the network side connection from the SGW (115) and PGW (117) The MME (113) may also choose to keep and reuse the signaling connection for the UE with eNodeB (121), by not releasing the S1-MME connection or sending a special S1 Release Command with cause code indicating that reconnection is expected. Then upon receiving the Offload Connect Request (221), the MME (113) would start to establish the offloading connection, e.g. the SIPTO connection via the S/PGW (119). The MME (113) would then respond to the UE (101) with an Offload Connect Accept (225) when the SIPTO connection setup (establishment) is successfully completed, as in step 225.

Upon receiving the Re-Connect Request (317) from the UE after the MME sends the Selective Offload Request, instead of Selective Offload Accept, the MME (113) becomes aware that the UE (101) has chosen to use the WLAN offload instead of the SIPTO. Therefore, the MME (113) would start to remove the Network Based Offload Trigger and also any pending actions, i.e. as if the SIPTO has never been triggered. The MME (113) would then sends back a Re-Connect Accept message to the UE (101). At the same time, the MME (113) would evaluate if the UE would be moved to IDLE mode, i.e. all the traffic could be moved to WLAN connection. This could be based on the current service/connection established by the UE (101), and additional indication in the Re-Connect Request (317) message. If the MME (113) decides that the UE (101) no longer needs the 3GPP connection, it would start to perform the MME initiated S1 release procedure, which would move the UE (101) into IDLE mode. This allows the UE to save power and the eNB to save resources for the UE. At this time, the UE (101) would then move the data traffic towards the WLAN access according to the routing policies.

(Embodiment 4: Alternative Operation with Reduced Signalling)

Figure 8:
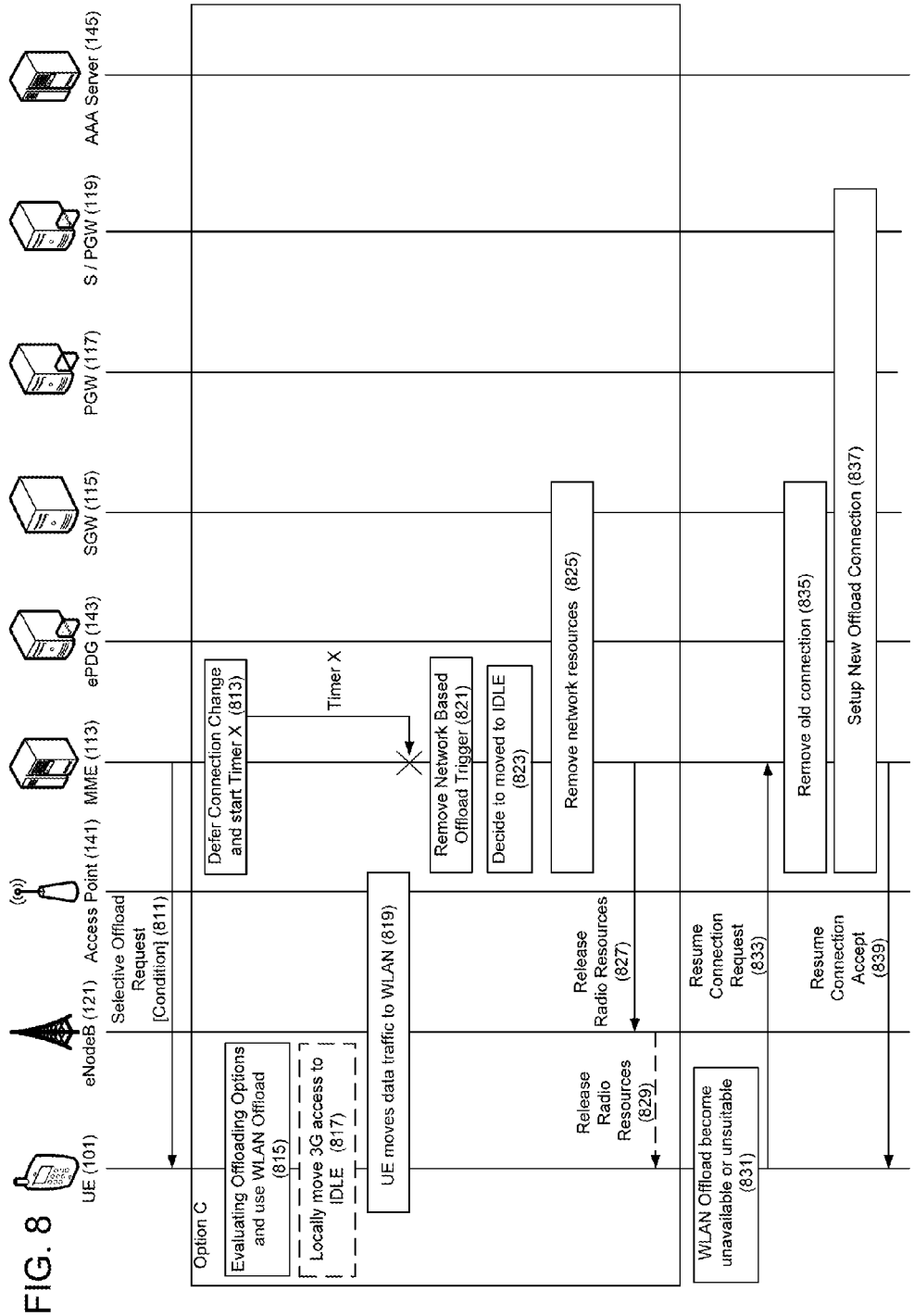
FIG. 8 is an example operation sequence of an alternative operation of the present disclosure for handling the offloading when WLAN based offloading is preferred.

With reference to FIG. 8, an alternative operation sequence to the "Option B" part of the FIG. 3 is illustrated. In this alternative, some signaling between UE (101) and MME (113) can be avoided, and thus saves network and UE resources.

As shown in the figure, step 811 and 815 is equivalent to that of 311 and 315. However, at step 813, when the MME (113) decides to defer the offloading operation at network side, it also starts a Timer X. The value of the X depends on the configuration and operator's policy. Generally, it should allow enough time for the UE (101) to receive and send signaling back to the MME (113) and also have enough time to perform the offloading evaluation, e.g. including obtaining the information over non-3G access.

On the UE (101) side, once it evaluate that the WLAN Offload is preferred, the UE (101) does not send any signaling message back to the MME (113), as if it has never received the Selective Offload Request (811). Furthermore, the UE (101) may also locally move the 3G access to IDLE mode if there is no other application requires using the access, as in step 817. The UE (101) would then further adjust its routing policies and start to use the WLAN Offload for the services, as in step 819.

At the MME (113) side, when the Timer X expires, the MME (113) would understand that the UE (101) has chosen the WLAN Offloading, and thus would remove the Network Based Offload Trigger, as in step 821. For example, in case of SIPTO, the MME (113) would decide to keep the existing PDN Connection via the PGW (117) instead of offloading to S/PGW (119). The MME (113) would also evaluate and decide if to move UE to IDLE mode over the 3GPP access, as in step 823. If there is no other connections from the UE (101) using the 3GPP access, the MME (113) would start to remove the network side resources for the PDN connection, as in step 825. The MME (113) would also issue commands to eNodeB (121) to release the S1 connection and related radio resources, as in step 827 and 829. It is obvious to anyone skilled in the art that step 829 would also make the UE (101) move into IDLE mode if it has not done that locally in step 817.

At certain point of time, the UE (101) may detect that WLAN Offload may become unavailable or unsuitable, as in step 831. This could be the result of step 517 or 519 of FIG. 5. In this case, the UE (101) would need to resume the 3GPP access and start the SIPTO offloading. The UE (101) does this by sending a Resume Connection Request, as in step 833. In case of the LTE system, the Resume Connection Request could be the Service Request or the TAU Request message. In certain implementations, the TAU Request or Service Request may contain additional flag or indicator to indicate to the MME (113) that network based offloading, e.g. SIPTO, should be re-triggered. However, in other implementation, such indicator could be implicitly inferred by the MME (113) if it is configured so, and thus normal TAU Request or Service Request could be used.

Upon reception of the Resume Connection Request (833), the MME (113) starts to perform the network side operation of offloading, e.g. to remove the old connection via SGW (115) and PGW (117), as in step 835, and setup the new SIPTO connection towards the S/PGW (119), as in step 837. After the successful setup of the connections, the MME (113) would inform the UE (101) of this change via Resume Connection Accept message, as in step 839. This step may also include the operation that instruct the eNodeB (121) to adjust the necessary settings and context for the UE (101) to support the new offloaded SIPTO connection.

It is obvious to anyone skilled in the art that the above operation steps may further include multiple signaling exchanges. This does not affect the general principle of the present disclosure.

(Embodiment 5: Alternative Operation with UE Mobility)

Figure 9:
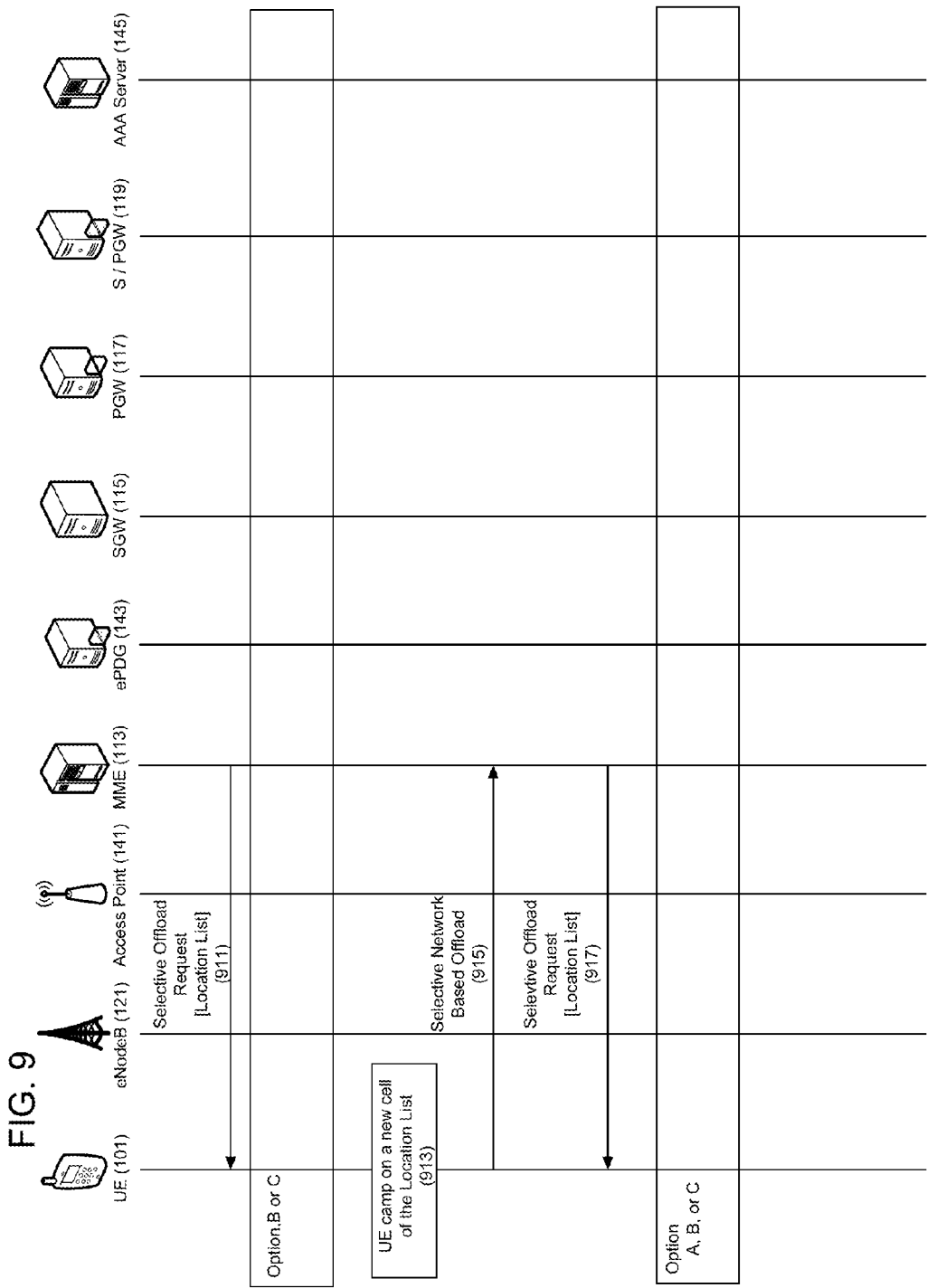
FIG. 9 is an example operation sequence of an alternative operation of the present disclosure for handling the offloading when UE moves.

With reference to FIG. 9, an alternative operation of the present disclosure that considers the UE mobility is presented. Normally, the network side offloading trigger is based on the UE (101) location. Therefore, when the UE (101) changes location, the MME (113) would evaluate if a network based offloading should be triggered. In case the UE (101) is kept in CONNECTED mode, the MME (113) may know its location at cell level. Therefore, the network based offloading could be triggered timely. However, if the UE is in the IDLE mode, the MME (113) only knows its location at Tracking Area (TA) or several TAs level. In the scenario previously described, during performing NSWO the UE is treated in IDLE mode on 3GPP access network, therefore, the MME (113) may miss out some opportunity to trigger the offloading which might provide better performance to the UE over SIPTO than NSWO.

One potential remedy is for the UE (101) to send a TAU message to the MME (101) every time when the UE changes camping cells to inform UE's location per eNodeB if it has rejected the Selective Offload Request, as shown in "Option B" or "Option C" of FIG. 3 and FIG. 8 respectively, or simply if it has initiated NSWO. However, this may create a lot of signalling load on the network side, and also may cause a waste of battery power at UE (101) side.

As shown in FIG. 9, an alternative operation is introduced to address such issue. For simplicity reasons, FIG. 9 only shows the operation step 911 and onwards. It is obvious to anyone skilled in the art that the operation step 201 to 209 as shown in FIG. 2 may also happen before step 911.

At step 911, when the MME (113) sends the Selective Offload Request message, it also includes a Location List in it. This Location List provides a list of cells that the same network based offloading should be triggered. This Location List can be carried in different forms, e.g. as a new information element, or as a new location component of the "Offload Condition". In case it is signalled as a new component of the "Offload Condition", the following format could be used:

{Location List} ::= {Location Group 1 ::=
    * {Cell ID} }
    {Location Group 2 ::=
    *{ CSG ID}}
    {Location Group 3 ::=
    *{ TAI}}

Wherein, the Location List includes one or multiple {Location Group}. In each of the {Location Group}, there is a list of Location Identifiers. These Location Identifiers could be in the form of Cell IDs or ECG's, or CSG IDs, or list of TAIs. It is obvious to anyone skilled in the art that the {Location List} does not need to include all the Location Groups. Furthermore, there could be other type of location identifiers used in the {Location List}.

The UE (101) would perform the normal operation, as of the "Option B" or "Option C" as shown in FIG. 3 and FIG. 8, after receiving the Selective Offload Request (911).

At certain point of time, UE (101) may change it is point of attachment in IDLE mode, as in step 913. For example, in LTE system, this means the UE (101) choose to camp on a new cell. At this point of time, the UE (101) will use the {Location List} to decide if it should inform the MME (113) of the change. For example, if the new cell is in the {Location Group 1}, the UE (101) would trigger a new Selective Network Based Offload (915) message to the MME (113).

This new Selective Network Based Offload (915) would carry the current location of the UE (101) to the MME (113). Therefore, the MME (113) would evaluate again if Network Based Offload should be triggered again. If the MME (113) decides that the new location is also suitable for a Network Based Offload, e.g. SIPTO, it would issue another Selective Offload Request (917) to the UE (101). This would further trigger the UE (101) to review the offloading option selection, as the "Option A", "Option B", or "Option C" that is shown in FIG. 2, FIG. 3, and FIG. 8. Thus, the Selective Offload Request (i.e. SIPTO indication) would be issued at appropriate location of the UE and the user could receive good experience if the SIPTO can provide better performance than NSWO.

In another alternative operation, the {Location List} could be used in another way. For example, UE (101) may only need to send the Selective Network Based Offload (916) when the new cell is not in the same {Location Group} as the previous cell, but is in another {Location Group}. In this sense, the {Location Group} means all the cells or locations that share the same offloading decision factor, i.e. if UE (101) decided to not perform SIPTO in one of the cell, it would not perform SIPTO in other cells of the group as well. Therefore, the offloading option only needs to be re-evaluated when UE (101) moves to a cell that is listed in another {Location Group}. This way, the UE (101) could further reduce the unnecessary signalling.

(Embodiment 6: Alternative Operation with Network Side Assistance)

Figure 10:
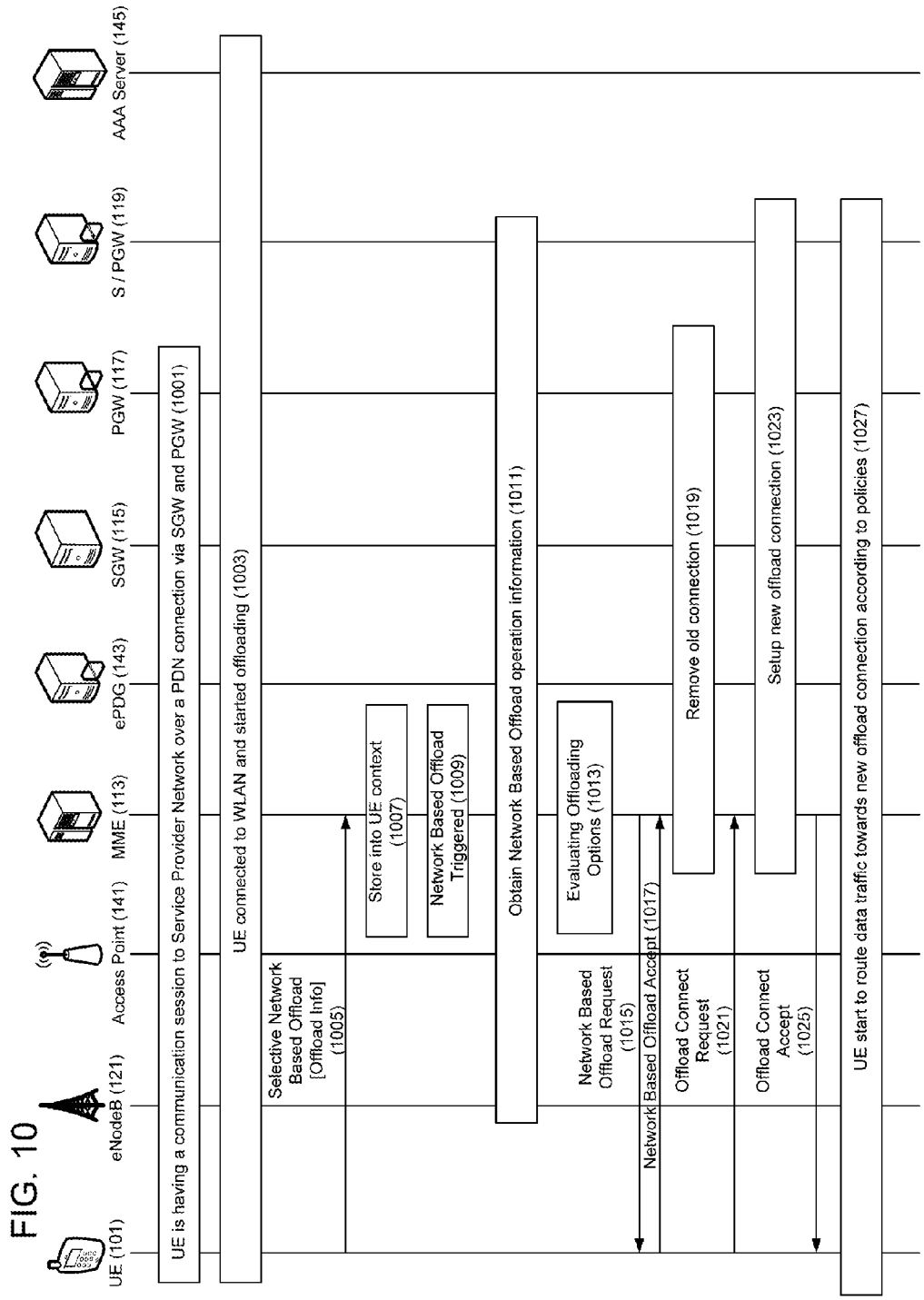
FIG. 10 is an example operation sequence of an alternative operation of the present disclosure where network controls the offloading evaluation.

With reference to FIG. 10, another alternative operation of the present disclosure is illustrated. In previous embodiments, the offloading evaluation operation are mainly performed at the UE (101) side. In the following operation sequence, the offloading evaluation process is mainly carried out at the network side, i.e. on the MME (113). This may allow the network to save on some unnecessary offloading triggering and related signalling.

As shown in the figure, the step 1001 and 1003 are identical to that of 201 and 203. However, at step 1005, the UE (101) sends a Selective Network Based Offload message to the MME (113), with an "Offload Information" element. Similar to that of 205 of FIG. 2, this Selective Network Based Offload message could be a TAU Request message or other Resource Management message with a special "selective" indicator. The "Offload Information" is a new information element included in the message. In case the "Offload Information" is included, it can also serve as another form of "selective" indicator, and therefore the "selective" indicator could be avoided.

```
{Offload Information} ::=  { QoS Component ::=
                {Maximum Bit Rate Allowed}
                {Delay}
                {Priority}
                {Load} }
             {Time Limit Component}
             {Range Limit Component}
             {Size Limit Component}
```

Wherein, the {Maximum Bit Rate Allowed} indicates the bandwidth that can be supported by the WLAN access and the backhaul link from the Local Access Network (140) to the Service Provider Network (120). The {Delay} indicates the expected delay over the WLAN access when accessing the service towards the Service Provider Network (120). The {Priority} would be the priority that is given to the service data flow over the WLAN access, and it could be for example mapped from the DiffServe Code Points (DSCP). The {Load} indicates the load status of the WLAN. It is obvious to anyone skilled in the art that the {QoS Component} may contain additional information, e.g. if the APN would be different, if the IP address preservation is supported, if the IP version is different, or any other information the UE might obtain through a Hotspot2.0 supported WLAN.

Once received this Selective Network Based Offload (1005) message, the MME (113) stores it into the UE (101)'s corresponding context. When the next time a Network Based Offloading is triggered, as in step 1009, the MME (113) would retrieve the related offloading operation parameters, as in step 1011. For example, this includes obtaining the potential Radio Access Network (RAN) parameters, e.g. the congestion level or the allowable bearer bandwidth, etc. The MME (113) may also obtain the information about the S/PGW (119), e.g. the bandwidth allowed for the UE, or the delay expected, etc.

The MME (113) would then make use of the "Offload Information" element and the offloading information obtained at step 1011 to evaluate the offloading options, i.e. whether it should trigger a network based offloading given the current UE (101)'s WLAN connection. For example, it may compare the bandwidth that can be provided by the SIPTO connection and that reported by the UE (101) via the WLAN, and only triggers SIPTO if the bandwidth is much higher. It is obvious to anyone skilled in the art that the MME (113) may also consider other aspect of the offloading in the evaluation, e.g. comparing the coverage area, content size limitation, etc.

In case the MME (113) decides that the network based offloading should be utilized instead of the WLAN for the UE (101)'s service data traffic, it would send a Network Based Offload Request (1015) to the UE (101). In a LTE system this Network Based Offload Request (1015) could be the Detach or Deactivate EPS Bearer Context Request. In some implementations, this Network Based Offload Request (1015) could further include a "non-selective" flag or indicator which indicates that this offloading request must be followed by the UE (101).

Upon reception of the Network Based Offload Request (1015), the UE (101) would respond with a Network Based Offload Accept, as in step 1017. Accordingly, the MME (113) would be triggered to perform the network side offloading operation, e.g. remove the connection resources with the SGW (115) and PGW (117). This is similar to that described in [NPD 1] for the SIPTO operation.

The UE (101) would be triggered to perform the Offload Connection Request, as in step 1021. This is similar to the re-connect request as described for the SIPTO operation in [NPD 1]. In a LTE system, this could be the Attach Request with the same APN, or the PDN Connectivity Request with the same APN. Such Offload Connection Request (1021) would trigger the establishment of the SIPTO connection, via the S/PGW (119), at network side, as in step 1023. Corresponding further signaling between the UE (101) and the MME (113) would be carried out, as in step 1025, e.g. Offload Connect Accept. It is obvious to anyone skilled in the art that there could be more signaling exchanges than that is shown in the figure. After receiving the Offload Connect Accept (1025), the UE (101) would start to route data traffic over the newly established offload connection, e.g. SIPTO connection, according to the routing rules.

(Embodiment 7: Alternative Architecture with SIPTO@LN/LIPA)

Figure 11:
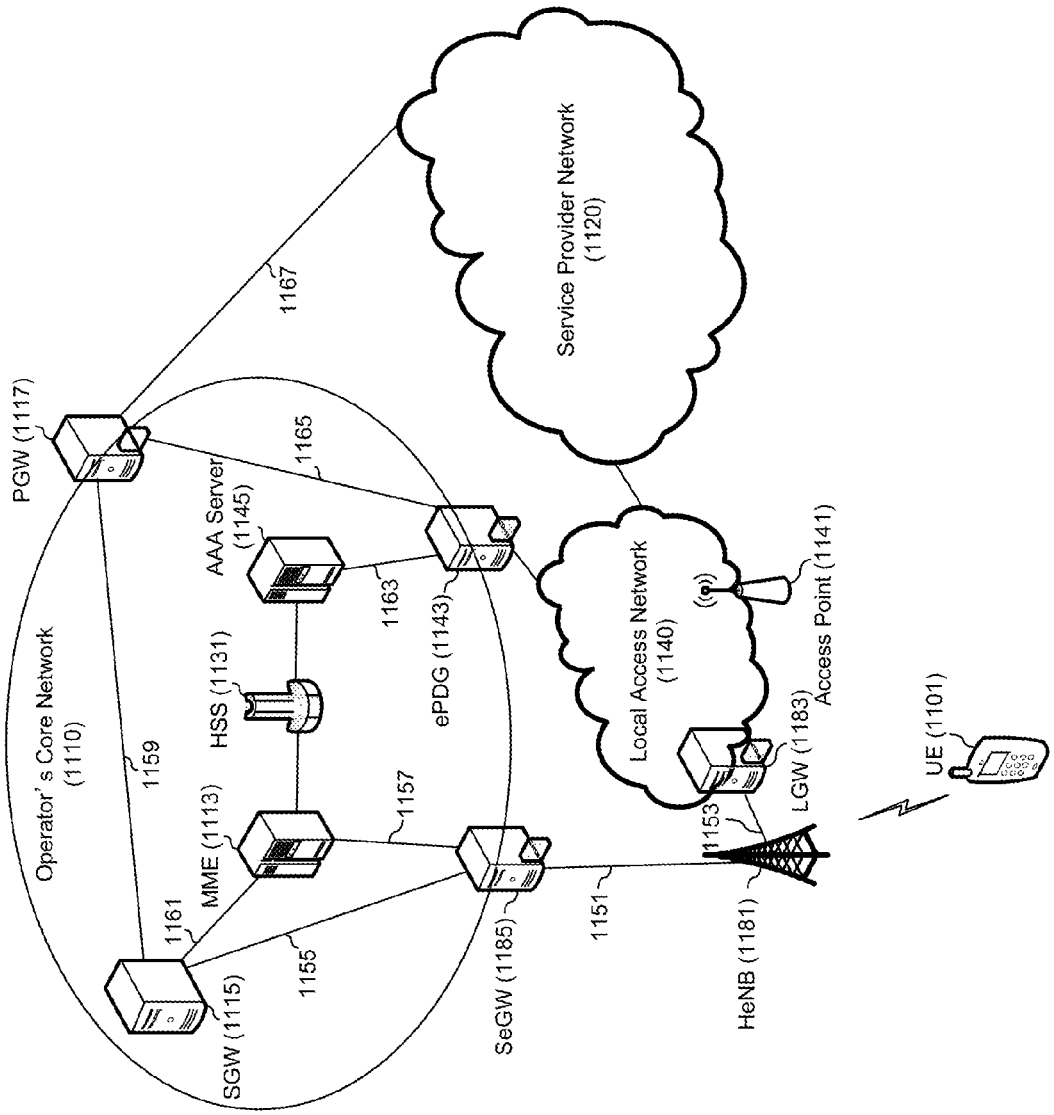
FIG. 11 is an example of the alternative network architecture that supports the present disclosure.

With reference to FIG. 11, an alternative network architecture that supports the present disclosure is illustrated. In FIG. 1, the network based offloading, e.g. SIPTO, has the exit point to the Service Provider Network (120) via an Operator Core Network (110) entity, e.g. S/PGW (119). However, in certain cases, e.g. when Femto cell is used, the offloading could be via a Local Access Network (1140) entity, e.g. the Local Gateway (LGW) (1183). In such a case, slightly different considerations should be taken in the evaluation of offloading options. However, generally, the operations introduced in the previous embodiments are still applicable, with minor adjustments. In the following descriptions, only the differences are highlighted.

As shown in the figure, the 3GPP access is provided by the Femto base station, i.e. the Home eNodeB (HeNB) (1181). In this case, the HeNB (1181) is connected to the Operator's Core Network (1110) via the Security Gateway (SeGW) (1185). The connection between the HeNB (1181) and the SeGW (1185) may go through the Local Access Network (1140) or another service provider network, and is security protected. For example, the HeNB (1181) may be use the IKEv2 protocol to establish an IPSec tunnel with the SeGW (1185). On the other hand, the LGW (1183), which resides in the Local Access Network (1140) and is controlled by the Operator's Core Network (1110) via a connection with the SGW (1115) (not shown in the figure), provides connection to the Service Provider Network (1120) for the UE (101). This is similar to that of the LIPA architecture as described in [NPD 1]. It is obvious to anyone skilled in the art that the LGW (1183) could be collocated with the HeNB (1181) or could be a standalone entity connected to the HeNB (1181) via a local interface 1153. This does not affect the general principle of the present disclosure.

As shown in the figure, in this architecture variant, the UE (1101) would have three choices of offloading, i.e. the SIPTO via the Local Access Network (1140), the LIPA via the Local Access Network, and the WLAN Offload via the Local Access Network.

Therefore, when the UE (101) evaluates the offloading options following the procedures as introduced in FIG. 2, 3, or 8, it needs to also taken into account of all the three options. Among the three options, the LIPA and WLAN Offload can be initiated by the UE (101), and the SIPTO can be initiated by the network, i.e. MME (113). On the other hand, the LIPA and SIPTO are using the 3GPP access, e.g. via the HeNB (1181), but WLAN is using the non-3GPP access, which may offer different link rates. And, in this case, all the three offloading options may share the same backhaul connection, which means that the backhaul status information obtained from WLAN Access Point may be applicable for all three.

For example, when the UE (1101) receives the "Offload Condition" information from the MME (113) for the SIPTO connection at step 211, 311, 811, 911 or 917, it may know that the same QoS parameter would probably apply to the LIPA connection if UE (1101) initiates it. However, LIPA connection may have a different roaming and mobility limitation. Therefore, those parameters in the "Offload Condition" cannot be used. Instead, the Local HeNB Network ID, or specific LIPA mobility limit parameters should be used. Such information may be obtained from the configuration, subscription, or from the HeNB (1181) directly.

Similarly, if the procedure as shown in FIG. 10 is used, the MME (113) also need to consider all three options. In this particular example, the MME (113) knows whether the UE (1101) is allowed for a LIPA connection in the current location based on the UE (1101)'s subscription profile and the location information. It may also be able to gauge the potential QoS that can be supported over the LIPA connection using the 3GPP radio access information and the backhaul link information reported by the UE (1101) for the WLAN Offload information. In such a way, MME (113) can also evaluate properly for all the three type of offloading options.

(Embodiment 8: Alternative Operation with UE Selecting Both Offload Path)

In the previous embodiments, it is assumed that only one type of offloading options would be selected for the UE (101, or 1101). Therefore, when one type of offloading is chosen, the other offloading option is either disabled or cancelled. However, in certain application of the present disclosure, there are cases where all the offloading options would be utilized at the same time.

For example, when the UE (101, or 1101) has some policies, e.g. OPIIS or ISRP rules, it may filter the data flow based on the data filters, and decide which access, or APN, or connection type to use. In certain cases, one particular application may be filtered into different categories, e.g. an IP Multimedia Service (IMS) session may have it is signaling flow, based on Session Initiation Protocol, routed over the 3GPP access due to priority and quality considerations, and its data flow, e.g. some UDP based traffic routed over the non-3GPP access due to the amount of data volume and bandwidth requirements. In such a case, the UE (101, 1101) or the network should allow both offloading options to happen, e.g. SIPTO and WLAN Offload.

When such a case happens, the operation procedure of the present disclosure would be slightly adjusted to accommodate it. For example, if the procedure as described in FIG. 2 happens, step 229 would not be skipped. Instead, at step 227, the UE (101) would only route the suitable traffic to the SIPTO connection, and route the other suitable traffic to the WLAN Offload connection.

Similarly, it is obvious that the procedure as described in FIG. 3 would not happen, as the UE (101) would decide that both offloading options should be allowed in step 315. And therefore, step 217 to 227 should be used instead of 317 to 331

In order for the UE to have such kind of decision (i.e. to use both connections of SIPTO and NSWO per individual traffic performance to be gained), the MME may provide the Offload Condition per traffic flow, e.g. per TFT entry. Thus, the UE can compare performance for SIPTO connection (being established) and NSWO connection (already established) per flow and select the more suitable connection for each traffic flow, which increases user benefit because the application traffic will be mapped appropriately into appropriate bearer and/or non-3GPP connection.

If the procedure as described in FIG. 10 is used, it is obvious that the UE (101) would start to route the traffic over both WLAN Offload connection and the SIPTO connection as step 1027, according to the OPIIS or ISRP rules.

It is obvious to anyone skilled in the art that the above operation adjustment does not affect the general principle of the present disclosure.

As for the UE (400) logic presented in FIG. 5, it can already cover the case. For example, at step 519, the UE (400) may be able to connect also the network based offloading, e.g. SIPTO, if the OPIIS or ISRP rules indicates so. Alternatively, the UE (400) may decide that at step 511 that both offloading should be utilized, and therefore, in step 525 to route the traffic over both SIPTO connection and WLAN Offload connection according to the OPIIS or ISRP rules.

In an aspect of the present disclosure, when the mobility management device transmits the second message, the mobility management device acquires the selection information from a gateway of the second network.

In an aspect of the present disclosure, when the mobility management device transmits the second message, the mobility management device maintains an existing connection of the mobile terminal in the second network until the mobile terminal makes a decision on offloading, when the mobile terminal performs the new offloading in the second network, the mobility management device disconnects the existing connection, configures a new connection for the new offloading and connects the mobile terminal to the new connection, and when the mobile terminal maintains the offloading in the first network, the mobility management device maintains the existing connection.

In an aspect of the present disclosure, the mobility management device transmits the selection information in units of traffic flow, and the mobile terminal decides whether the offloading is to be maintained in the first network or whether new offloading is to be performed in the second network in units of traffic flow.

In an aspect of the present disclosure, the mobile terminal transmits the first message with threshold information incorporated therein, the threshold information being necessary for offloading in the second network, and the mobility management device decides whether or not to transmit the second message on a basis of the threshold information included in the first message.

In one general aspect of the present disclosure, the present disclosure provides for a mobility management device. The mobility management device comprising: a reception unit that receives a first message that is transmitted from the mobile terminal when the mobile terminal starts offloading in a first network, the first message including information indicating that the offloading is started; a generation unit that generates a second message, the second message including selection information in a second network to which the mobility management device belongs, the selection information being for selecting, on a basis of the first message, as to in which network offloading is to be performed; and a transmission unit that transmits the generated second message to the mobile terminal.

In an aspect of the present disclosure, further comprising acquisition unit that, when the second message is generated, acquires the selection information from a gateway of the second network.

In an aspect of the present disclosure, when the mobility management device transmits the second message, the control unit maintains an existing connection of the mobile terminal in the second network until the mobile terminal makes a decision on offloading, when the mobile terminal performs new offloading in the second network, the control unit disconnects the existing connection, configures a new connection for the new offloading and connects the mobile terminal to the new connection, and when the mobile terminal maintains the offloading in the first network, the control unit maintains the existing connection.

In an aspect of the present disclosure, the transmission unit transmits the selection information in units of traffic flow and the mobile terminal decides whether the offloading is to be maintained in the first network or whether new offloading is to be performed in the second network in units of traffic flow.

In an aspect of the present disclosure, the reception unit receives, from the mobile terminal, the first message including threshold information that is necessary for offloading in the second network, and the generation unit decides whether or not to generate the second message on a basis of the threshold information included in the first message.

In one general aspect of the present disclosure, the present disclosure provides for a mobile terminal. The mobile terminal comprising: a generation unit that generates a first message when the mobile terminal starts offloading in a first network, the first message including information indicating that the offloading is started; a transmission unit that transmits the generated first message to a mobility management device performing mobility management of the mobile terminal in a second network, a reception unit that receives a second message transmitted from the mobility management device, the second message including selection information in the second network, the selection information being for selecting, on a basis of the first message, as to in which network offloading is to be performed; and a control unit that decides whether the offloading is to be maintained in the first network, or whether a new offloading is to be performed in the second network on a basis of the selection information included in the received second message and judgement information in the first network that the mobile terminal has.

In an aspect of the present disclosure, the transmission unit transmits the first message with threshold information incorporated therein, the threshold information being necessary for offloading in the second network.

In an aspect of the present disclosure, the reception unit receives the selection information in units of traffic flow and the control unit decides whether the offloading is to be maintained in the first network or whether the new offloading is to be performed in the second network in units of traffic flow.

The above aspects may be implemented by combination. These aspects may be implemented by a program to let a computer implement the method and recording medium recorded the program in addition to the offloading method, the mobility management device, and the mobile terminal.

Further, functional blocks of the above-mentioned embodiment may be implemented by hardware, software, or any combination of the hardware and the software. For example, each functional block of FIG. 4 and FIG. 6 may be implemented by hardware such as CPU or memory of any computer. In addition, any computer implements program that processes of each function are described, and the each functional block may be implemented. In addition, flow charts or sequence charts of the above-mentioned embodiment may be implemented by hardware such as CPU or memory.

Each functional block used in the description of the embodiments as given above can be realized as LSI, typically represented by the integrated circuit. These may be produced as one chip individually or may be designed as one chip to include a part or all. Here, it is referred as LSI, while it may be called IC, system LSI, super LSI, or ultra LSI, depending on the degree of integration. Also, the technique of integrated circuit is not limited only to LSI and it may be realized as a dedicated circuit or a general-purpose processor. FPGA (Field Programmable Gate Array), which can be programmed after the manufacture of LSI, or a reconfigurable processor, in which connection or setting of circuit cell inside LSI can be reconfigured, may be used. Further, with the progress of semiconductor technique or other techniques derived from it, when the technique of circuit integration to replace LSI may emerge, the functional blocks may be integrated by using such technique. For example, the adaptation of bio-technology is one of such possibilities.

INDUSTRIAL APPLICABILITY

The present disclosure is applicable to the mobile communication networks that provide different connections to the UE.

The invention claimed is:

1. An offloading method for a mobile terminal connectable to a plurality of networks having different properties, comprising the steps of:
  when the mobile terminal starts offloading in a first network, transmitting, by the mobile terminal, a first message to a mobility management device performing mobility management of the mobile terminal in a second network, the first message including information indicating that the offloading has started;
  transmitting, by the mobility management device, a second message to the mobile terminal, the second message including selection information in the second network, the selection information being for selecting, on a basis of the first message, as to in which network offloading is to be performed; and
  deciding, by the mobile terminal, whether the offloading is to be maintained in the first network or whether new offloading is to be performed in the second network on a basis of the selection information included in the second message and judgment information in the first network that the mobile terminal has, wherein:
  when the mobility management device transmits the second message, the mobility management device maintains an existing connection of the mobile terminal in the second network until the mobile terminal makes a decision on offloading, when the mobile terminal transmits, to the mobility management device, a message indicative of performing the new offloading in the second network, the mobility management device disconnects the existing connection, configures a new connection for the new offloading and connects the mobile terminal to the new connection, and when the mobile terminal transmits, to the mobility management device, a message indicative of maintaining the offloading in the first network, the mobility management device maintains the existing connection.

2. The offloading method according to claim 1, wherein when the mobility management device transmits the second message, the mobility management device acquires the selection information from a gateway of the second network.

3. The offloading method according to claim 1, wherein the mobility management device transmits the selection information in units of traffic flow, and the mobile terminal decides whether the offloading is to be maintained in the first network or whether new offloading is to be performed in the second network in units of traffic flow.

4. The offloading method according to claim 1, wherein
the mobile terminal transmits the first message with threshold information incorporated therein, the threshold information being necessary for offloading in the second network, and
the mobility management device decides whether or not to transmit the second message on a basis of the threshold information included in the first message.

5. A mobility management device being used for an offloading method of a mobile terminal connectable to a plurality of networks having different properties, the mobility management device comprising:
a reception unit that receives a first message that is transmitted from the mobile terminal when the mobile terminal starts offloading in a first network, the first message including information indicating that the offloading has started;
a generation unit that generates a second message, the second message including selection information in a second network to which the mobility management device belongs, the selection information being for selecting, on a basis of the first message, as to in which network offloading is to be performed;
a transmission unit that transmits the generated second message to the mobile terminal, and
a control unit, wherein:
when the mobility management device transmits the second message, the control unit maintains an existing connection of the mobile terminal in the second network until the mobile terminal makes a decision on offloading,
when the mobile terminal transmits, to the mobility management device, a message indicative of performing new offloading in the second network, the control unit disconnects the existing connection, configures a new connection for the new offloading and connects the mobile terminal to the new connection, and
when the mobile terminal transmits, to the mobility management device, a message indicative of maintaining the offloading in the first network, the control unit maintains the existing connection.

6. The mobility management device according to claim 5, further comprising acquisition unit that, when the second message is generated, acquires the selection information from a gateway of the second network.

7. The mobility management device according to claim 5, wherein the transmission unit transmits the selection information in units of traffic flow and the mobile terminal decides whether the offloading is to be maintained in the first network or whether new offloading is to be performed in the second network in units of traffic flow.

8. The mobility management device according to claim 5, wherein
the reception unit receives, from the mobile terminal, the first message including threshold information that is necessary for offloading in the second network, and
the generation unit decides whether or not to generate the second message on a basis of the threshold information included in the first message.

9. A mobile terminal in an offloading method for the mobile terminal connectable to a plurality of networks having different properties, the mobile terminal comprising:
a generation unit that generates a first message when the mobile terminal starts offloading in a first network, the first message including information indicating that the offloading has started;
a transmission unit that transmits the generated first message to a mobility management device performing mobility management of the mobile terminal in a second network,
a reception unit that receives a second message transmitted from the mobility management device, the second message including selection information in the second network, the selection information being for selecting, on a basis of the first message, as to in which network offloading is to be performed; and
a control unit that decides whether the offloading is to be maintained in the first network, or whether a new offloading is to be performed in the second network on a basis of the selection information included in the received second message and judgement information in the first network that the mobile terminal has, wherein:
the transmission unit transmits, to the mobility management device, a message indicative of performing the new offloading in the second network in case that the control unit decides that the new offloading is to be performed in the second network, and
the transmission unit transmits, to the mobility management device, a message indicative of maintaining the offloading in the first network in case that the control unit decides the offloading is to be maintained in the first network.

10. The mobile terminal according to claim 9, wherein the transmission unit transmits the first message with threshold information incorporated therein, the threshold information being necessary for offloading in the second network.

11. The mobile terminal according to claim 9, wherein the reception unit receives the selection information in units of traffic flow and the control unit decides whether the offloading is to be maintained in the first network or whether the new offloading is to be performed in the second network in units of traffic flow.

* * * * *